(12) United States Patent
Chen et al.

(10) Patent No.: US 12,432,224 B2
(45) Date of Patent: Sep. 30, 2025

(54) PROACTIVE MALICIOUS NEWLY REGISTERED DOMAIN DETECTION

(71) Applicant: Palo Alto Networks, Inc., Santa Clara, CA (US)

(72) Inventors: Zhanhao Chen, Sunnyvale, CA (US); Daiping Liu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 358 days.

(21) Appl. No.: 17/550,443

(22) Filed: Dec. 14, 2021

(65) Prior Publication Data

US 2023/0188541 A1 Jun. 15, 2023

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/0236* (2013.01); *H04L 63/20* (2013.01)

(58) Field of Classification Search
CPC . H04L 63/1416; H04L 63/0236; H04L 63/20; G06N 20/00

USPC ........................................................ 713/168
See application file for complete search history.

(56) References Cited

U.S. PATENT DOCUMENTS

| | | | |
|---|---|---|---|
| 11,736,512 B1* | 8/2023 | Overson | H04L 63/1416 726/23 |
| 2015/0154720 A1* | 6/2015 | Matkowsky | G06Q 50/184 705/310 |
| 2018/0198805 A1* | 7/2018 | Vejman | H04L 63/14 |
| 2020/0358819 A1* | 11/2020 | Bowditch | G06F 17/18 |
| 2021/0377303 A1* | 12/2021 | Bui | G06F 40/14 |
| 2022/0147815 A1* | 5/2022 | Conwell | G06N 3/045 |
| 2022/0201036 A1* | 6/2022 | Nabeel | H04L 63/1425 |

* cited by examiner

*Primary Examiner* — Linglan Edwards
*Assistant Examiner* — Phuc Pham
(74) *Attorney, Agent, or Firm* — Van Pelt, Yi & James LLP

(57) ABSTRACT

The present application discloses a method, system, and computer system for determining whether a registered domain is malicious. The method includes that a newly registered domain is registered, applying a malicious domain detector in connection with determining whether the newly registered domain is malicious, and in response to determining that the newly registered domain is malicious, sending to a security entity an indication that the newly registered domain is malicious.

24 Claims, 11 Drawing Sheets

| Feature | Description | Weighting |
|---|---|---|
| TLD Reputation | Malicious percentage | w1 |
| Registration Reputation | Malicious Percentage | w2 |
| NS Reputation | Each record only contain single ns | w3 |
| Email Reputation | Malicious percentage | w4 |
| WHOIS Service Reputation | Malicious percentage | w5 |
| Registrant Name Reputation | Malicious percentage | w6 |
| Registrant Email Reputation | Malicious percentage | w7 |
| Registrant Organization Reputation | Malicious percentage | w8 |
| Date Reputation | Malicious percentage created at date/time/day | w9 |
| Domain length | Length of domain name | w10 |
| Alexa Domain Similarity | Similarity of domain to Alexa domains | w11 |
| Common Word Similarity | Similarity of domain to common words | w12 |
| Hellcat Malicious Domain Similarity | Similarity of domain to Hellcat malicious domains | w13 |
| WHOIS Cluster Size | Number of domains updated that same set of attributes | w14 |

PROACTIVE MALICIOUS NEWLY REGISTERED DOMAIN DETECTION

BACKGROUND OF THE INVENTION

Nefarious individuals attempt to compromise computer systems in a variety of ways. As one example, such individuals may seek to register domains or subdomains. Upon successful registration of a domain or subdomain, nefarious individuals may seek host malicious services on such domains or subdomains, such as causing malware to infect client terminals attempting the access the services previously provided by the genuine individual or service. Accordingly, there exists an ongoing need for improved techniques to identify resources exposed to the hijacking of resources by nefarious individuals

BRIEF DESCRIPTION OF THE DRAWINGS

Various embodiments of the invention are disclosed in the following detailed description and the accompanying drawings.

FIG. 7 is a table of features used in connection with detecting a malicious newly registered domain according to various embodiments.

DETAILED DESCRIPTION

Figure 1:
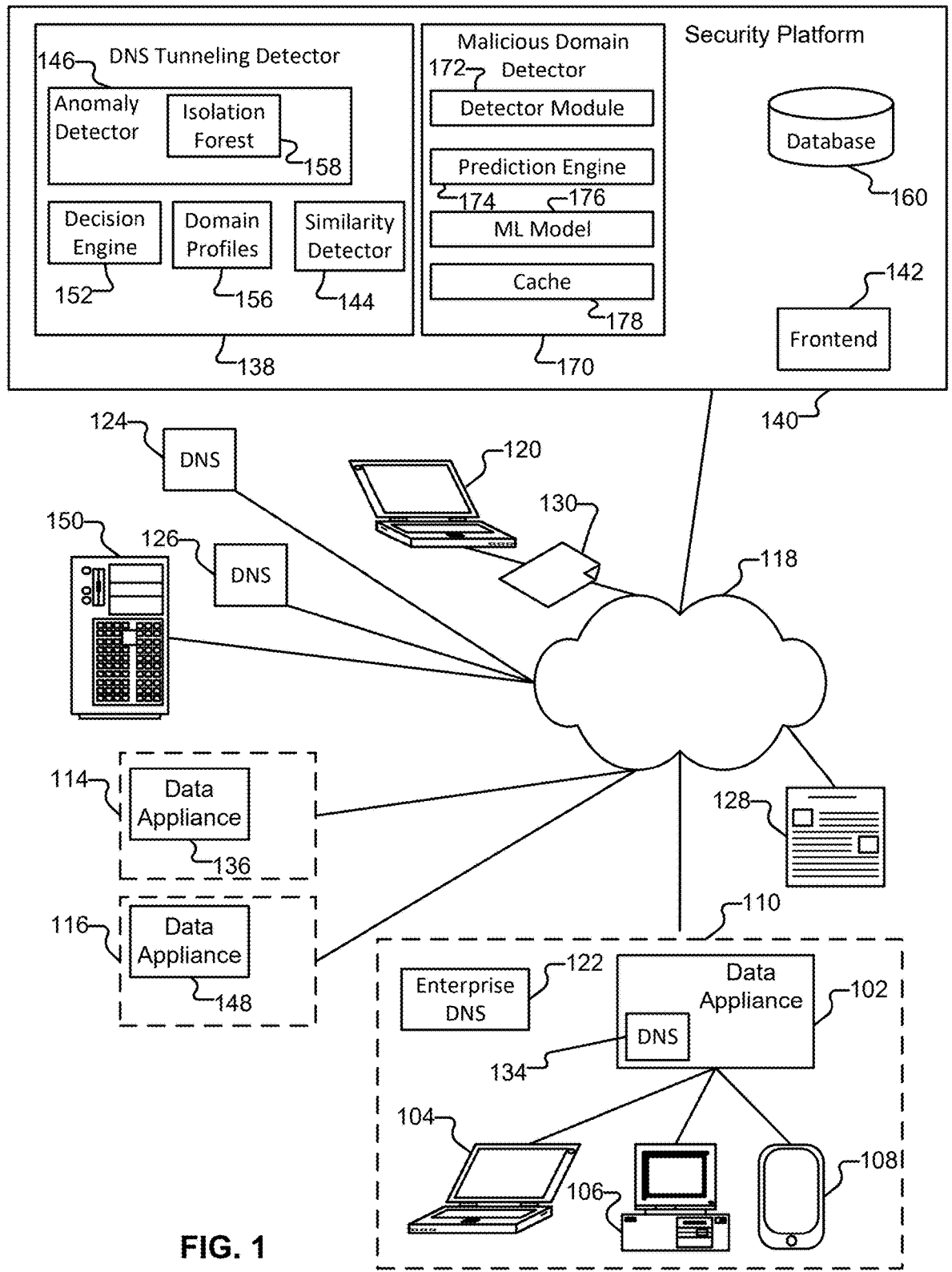
FIG. 1 is a block diagram of an environment in which malicious newly registered domains are detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "WHOIS record" refers to a record including registration information pertaining to a corresponding domain such as a root domain. Examples of information comprised in the registration information include a name of an owner, an owner contact information (e.g., mailing address) address, a date that the corresponding domain was registered, a company or organization associated with the owner, etc.

As used herein, a feature is a measureable property or characteristic manifested in input data, which may be raw data. As an example, a feature may be as set of one or more relationships manifested in the input data.

Nefarious individuals may seek to register a domain (e.g., a root domain) in order to spoof third parties attempting to obtain a service or information from the domain. For example, a malicious party may attempt to register a domain that it knows to be expired and that it knows provided a genuine service to third parties before lapsing of the registration for the record. As another example, a malicious party may attempt to register a domain that is similar to another domain that is known to provide a genuine service to third parties (e.g., a domain of a large and reputable organization, etc.). A similar domain may be a domain that corresponds to a string of characters substantially the same as a genuine domain and modified with an intentional misspelling, additional alphanumeric character, transposed character, etc. Accordingly, ingress and egress communications with respect to the domain would be subject to being exposed to malicious parties. If a malicious party is successful in registering a lapsed domain, the malicious party can send out emails or other communications to third parties that are unaware of the change in registration of the record. Similarly, if a malicious party is successful in registering a lapsed domain, the malicious party may set redirects such that a third party attempting to access the domain is redirected to the malicious party or attacker that now owns, or otherwise has registration with respect to, the domain. In the case of domain, if a malicious party successfully registers the domain, the malicious party may hijack the authoritative DNS. In view of the above, there is a need for active detection (e.g., prediction, characterization, etc.) of malicious newly registered domains.

According to various embodiments, the system determines whether newly registered domains are malicious (e.g., correspond to malicious domains). In some embodiments, the system monitors for newly registered domains, and in response to determining a set of newly registered domains, the system determines whether any of the set of newly registered are malicious. In some embodiments, determining whether a newly registered domain is malicious includes analyzing one or more attributes of the domain and/or registration information pertaining to the domain (e.g., registration information obtained from a WHOIS record for the domain), and determining (e.g., predicting) whether the domain is malicious based at least in part on the analysis of the one or more attributes of the domain and/or registration information pertaining to the domain. The analyzing one or more attributes of the domain and/or registration information pertaining to the domain may include using a machine learning model in connection with determining whether the one or more attributes of the domain and/or registration information pertaining to the domain are indicative of a malicious domain.

According to various embodiments, the machine learning model is trained based at least in part on a dataset of historical domains and historical information associated with the historical domains indicating whether a particular domain is malicious. In some embodiments, the historical information associated with the historical domains indicating whether a particular domain is malicious can be obtained (e.g., received) from a third party such as a third party service. An example of the historical information associated with the historical domains indicating whether a particular domain is malicious corresponds to a VirusTotal® (VT) score. In the case of a VT score greater than 0 for a particular domain, the particular domain is deemed malicious by the third party service. In some embodiments, the historical information associated is with the historical domains indicating whether a particular domain is malicious corresponds to a social score such as a community-based score or rating (e.g., a reputation score) indicating that a domain is malicious or likely to be malicious. The historical information (e.g., from a third party service, a community-based score) indicates whether other vendors or cyber security organizations deem the particular domain to be malicious.

The use of historical information in connection with mediating traffic to particular domains helps avoid traffic to/from malicious domains. However, the historical information is significantly delayed from a date on which a domain is registered. For example, the historical information with respect to a particular domain is generally generated or available approximately one month after the domain is registered. Accordingly, during the time period between the date on which a domain is registered and the date on which the historical information (e.g., a third party indication whether the domain is malicious such as from a third party service, a community-based score, etc.) a malicious party may attempt to infect end points such as client terminals that communicate with the domain.

Various embodiments provide a method and system for determining whether a newly registered domain is malicious before the historical information (e.g., from a third party service, a community-based score) is generated (e.g., determined) for the domain. In some embodiments, the system obtains registration information for a newly registered domain (e.g., the WHOIS record) upon, or shortly after, the registration information is available to the public (e.g., is published such as by the registrant). For example, the system obtains the registration information for a particular domain on the order of days from the date of registration of the domain. WHOIS data is generally publicly available within one day of a domain being registered. In some embodiments, the system monitors registrations (e.g., domain registrations) for a newly registered domain. For example, determining that a newly registered domain is registered includes monitoring registration of one or more domains, and detecting that the newly registered domain is registered based at least in part on the monitoring the registrations of one or more domains. As an example, the monitoring registration of one or more domains includes receiving a list of domains that are newly registered. In some embodiments, the system obtains WHOIS data at predetermined intervals or a predetermined frequency. For example, the system obtains WHOIS data daily (e.g., seven days a week, or on business days, etc.). In some embodiments, the system queries for new registration data (e.g., the system queries for new WHOIS records daily).

According to various embodiments, the system determines whether a newly registered domain is malicious (e.g., detects a malicious domain) in less than thirty days after the domain is registered. In some embodiments, the system determines whether a newly registered domain is malicious (e.g., detects a malicious domain) in less than ten days after the domain is registered. For example, the system determines detects a malicious domain on average between nine and ten days from the date of registration of the domain. Because malicious activity usually occurs shortly after registration of a domain, early detection of a malicious domain (e.g., determination that a domain is malicious) has a relatively more pronounced impact of identifying and taking active measures with respect to malicious domains (e.g., blocking traffic to/from the domains) than wait until historical information for a domain is available (e.g., waiting until a third party service provides a reputational score, or a community-based reputational score/consensus is determined). According to various embodiments, predicting whether a domain is malicious using the malicious domain detector (e.g., a machine learning process) covers (e.g., can provide protection for) at least 2.5 times more malicious DNS traffic compared to using historical information for a domain to detect and perform active measures with respect to malicious traffic. In some embodiments, predicting whether a domain is malicious using the malicious domain detector (e.g., a machine learning process) covers (e.g., can provide protection for) on average at least 4.28 times more malicious DNS traffic compared to using historical information for a domain to detect and perform active measures with respect to malicious traffic.

The system may use the registration information for a domain in connection with determining whether a newly registered domain is malicious (or is likely to be malicious). In some embodiments, the system predicts whether a domain is malicious based at least in part on the registration information. For example, the system obtains the registration information and uses a malicious domain detector to determine whether a domain is malicious. As another example, the system obtains the registration information and uses a malicious domain detector to determine a likelihood that a domain is malicious. According to various embodiments, the system proactively predicts whether a domain is malicious such as before historical information (e.g., indicating whether the particular domain is malicious) is available (e.g., from a third party service, etc.). For example, in response to receiving the registration for a domain, the system uses a machine learning model (e.g., a machine learning process) to determine (e.g., predict) whether a domain is malicious.

In some embodiments, the system obtains a likelihood (e.g., a predicted likelihood) that a newly registered domain is malicious based at least in part on the analysis of (e.g., the use of the machine learning model to analyze) the one or more attributes of the domain and/or registration information pertaining to the domain. The system may deem the newly registered domain to be malicious (e.g., a malicious domain) in response to a determination that likelihood that a newly registered domain is malicious exceeds a threshold value (e.g., a likelihood threshold value). The threshold value may be configurable, such as by an administrator (e.g., an administrator of a service that provides predictions/determinations of whether domains, such as newly registered domains, are malicious), or a customer of a service that provides the predictions/determinations of whether domains are malicious (e.g., an administrator of the customer). In some embodiments, the likelihood that the newly registered domain is malicious is determined based at least in part on a degree of similarity between the newly registered domain and one or more other malicious domains. In some embodiments, the likelihood that the newly registered domain is malicious is determined based at least in part on a degree of similarity between the newly registered domain and one or more domains that are deemed benign.

According to various embodiments, the system applies a malicious domain detector in connection with determining whether the newly registered domain is malicious. The applying malicious domain detector in connection with determining whether the newly registered domain is malicious may include applying a machine learning model to determine whether the newly registered domain is malicious. In some embodiments, the machine learning model is trained based at least in part on one or more domain registrations. For example, the machine learning model is trained using the historical information for the one or more domains (e.g., the third party indication whether the domain is malicious such as from a third party service, a community-based score, etc.). As another example, the machine learning model is trained based at least in part on one or more attributes associated with the one or more domain registrations.

In some embodiments, the malicious domain detector determines whether a newly registered domain is malicious (e.g., a likelihood that the newly registered domain is malicious exceeds a threshold value). The malicious domain detector may apply a machine learning model (also referred to herein as a model) in connection with analyzing a newly registered domain. According to various embodiments, a feature is used in connection with training a model and/or deployment of a model such as for use with a service such as a service for detecting malicious newly registered domains. In some embodiments, the set of one or more features used in connection with training a model is the same set of one or more features used in connection with deployment of the model. Examples of the features used in connection with training/applying the model include (a) a feature pertaining to a domain reputation such as a reputation of a TLD, (b) a feature pertaining to a domain registration (or a reputation thereof); (c) a feature pertaining to a nameserver (or a reputation thereof); (d) a feature pertaining to an email (or a reputation thereof) such as a reputation of an email address or domain corresponding to a registration of a domain; (e) a feature pertaining to a WHOIS server (or a reputation thereof) associated with a domain registration; (f) a feature pertaining to a registrant associated with a domain registration (or a reputation thereof); (g) a feature pertaining to a registrant email associated with a domain registration (or a reputation associated with such email); (h) a feature pertaining to a registrant organization associated with a domain registration (or a reputation associated with the organization); (i) a feature pertaining to an hour or time at which a domain is registered (or a reputation associated with the hour or time); (j) a feature pertaining to a particular day of the week on which a domain is registered (or a reputation thereof); (k) a feature pertaining to an extracted associated with a domain registration (or a reputation thereof); (l) a feature pertaining to a domain of a registrant email associated with a domain registration (or a reputation thereof); (m) a feature pertaining to a domain name length; (n) a feature pertaining to a similarity of a domain name to an Alexa domain; (o) a feature pertaining to a similarity of a domain to a set of common words, (p) a feature pertaining to a similarity of a domain to a set of known malicious domains, (q) a feature pertaining to date on which a domain registration is updated; (r) a feature pertaining to a number of domains updated on a same day to have the same nameserver, registrar, registrant email, registrant organization, and email. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

According to various embodiments, in response to determining that a newly registered domain is malicious (or likely to be malicious), the system sends an indication that the newly registered domain is malicious to a security entity. For example, the system may publish the indication that the newly registered domain is malicious to a set of one or more firewalls. The set of one or more firewalls may correspond to firewalls or networks for which the system provides protective service (e.g., firewalls or networks for customers of the system). As another example, the system may automatically send the indication that the newly registered domain is malicious to the security entity (e.g., automatically publish to the set of one or more firewalls the indication in response to determining that the newly registered domain is malicious. The security entity may enforce one or more policies (e.g., security policies) with respect to the newly registered domain. For example, in response to receiving the indication that the newly registered domain is deemed malicious, the security entity may update a policy, or the newly registered domain may satisfy one or more criteria pertaining to a policy based at least in part on the newly registered domain being associated with an indication that the domain is malicious. An action (or inaction) to be performed by the security entity with respect to the newly registered domain (e.g., with respect to traffic for the newly registered domain) may be based at least in part on the one or more policies. In some embodiments, the one or more policies are configurable. For example, the one or more policies may be customer specific. As an example, the one or more policies may be configured by a customer (e.g., an administrator of a customer), a service provider, etc. In some embodiments, the system blocks incoming traffic from, and/or outgoing traffic to, the newly registered domain. In some embodiments, the system provides an alert in response to incoming from, and/or outgoing traffic to, the newly registered domain. For example, the alert may be provided to a customer such as a customer administrator, a device on a customer network, and/or a device managed by a customer.

The system improves detection of malicious traffic and/or malicious domains. Further, the system further improves the handling of DNS traffic (e.g., response to DNS traffic) by preventing (or improving prevention of) malicious traffic being sent to/from a domain that is deemed to be malicious or likely to be malicious. Further, the system can provide accurate and low latency updates to security entities (e.g., endpoints, firewalls, etc.) to enforce one or more security policies (e.g., predetermined and/or customer-specific security policies) with respect to traffic to malicious or newly registered domains. Accordingly, the system prevents proliferation of malicious traffic to newly registered domains (e.g., domains that have been registered for a certain period such as less than 30 days, or such period of time before historical information for the domains is available).

FIG. 1 is a block diagram of an environment in which malicious newly registered domains are detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within (or from coming into) enterprise network 110.

Data appliance 102 can be configured to work in cooperation with a remote security platform 140. Security platform 140 can provide a variety of services, including performing static and dynamic analysis on malware samples, providing a list of signatures of known-malicious files to data appliances, such as data appliance 102 as part of a subscription, identifying malicious domains, detecting newly registered domains, predicting whether a newly registered domain is malicious, and providing an indication of malicious domains (e.g., an indication that a newly registered domain is malicious). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises DNS tunneling detector 138 and/or malicious domain detector 170. In some embodiments, malicious domain detector 170 comprises one or more of detector module 172, prediction engine 174, machine learning (ML) model 176, and/or cache 178.

Detector module 172 is used in connection with determining whether to use a predictive engine in connection with a domain. In some embodiments, detector module 172 determines whether information pertaining to a particular domain is comprised in a dataset of historical domains and historical information associated with the historical domains indicating whether a particular domain is malicious. In response to determining that information pertaining to a particular domain is not comprised in, or available in, dataset of historical domains and historical information, detector module 172 determines to use malicious domain detector 170 (e.g., predictive engine 174) to determine whether the particular domain is malicious. An example of the historical information associated with the historical domains indicating whether a particular domain is malicious corresponds to a VirusTotal® (VT) score. In the case of a VT score greater than 0 for a particular domain, the particular domain is deemed malicious by the third party service. In some embodiments, the historical information associated with the historical domains indicating whether a particular domain is malicious corresponds to a social score such as a community-based score or rating (e.g., a reputation score) indicating that a domain is malicious or likely to be malicious. The historical information (e.g., from a third party service, a community-based score) indicates whether other vendors or cyber security organizations deem the particular domain to be malicious.

In some embodiments, detector module 172 determines a domain is newly registered. Detector module 172 may detect registration of one or more domains. For example, detector module 172 may detect that a domain is newly registered contemporaneous with registration of the domain. As another example, detector module 172 may detect that a domain is newly registered shortly after such registration (e.g., within a week, less than 3 days, within a day, etc.). In some embodiments, the system (e.g., malicious domain detector 170, detector module 172, etc.) obtains registration information for a newly registered domain (e.g., the WHOIS record) upon, or shortly after, the registration information is available to the public (e.g., is published such as by the registrant). For example, the system (e.g., malicious domain detector 170, detector module 172, etc.) obtains the registration information for a particular domain on the order of days from the date of registration of the domain. WHOIS data is generally publicly available within one day of a domain being registered. In some embodiments, the system monitors registrations (e.g., domain registrations) for a newly registered domain. For example, malicious domain detector 170 (e.g., detector module 172) queries domain registration information from a third party (e.g., a registrar, etc.). Malicious domain detector 170 may query the third party for registration information for newly registered domains (or a set of domains from which the system may determine which domains correspond to newly registered domains) at predetermined intervals (e.g., customer-specified intervals, etc.). As an example, malicious domain detector 170 may query the third party for registration information for newly registered domains daily (or daily during the business week). In some embodiments, malicious domain detector 170 monitors registration of one or more domains, and detector module 172 detects that the newly registered domain is registered based at least in part on the monitoring the registrations of one or more domains. As an example, the monitoring registration of one or more domains includes receiving a list of domains that are newly registered. In some embodiments, the system obtains WHOIS data at predetermined intervals or a predetermined frequency. For example, the system obtains WHOIS data daily (e.g., seven days a week, or on business days, etc.). In response to determining that information for a newly registered domain is received (e.g., in connection with the monitoring or querying for registration information of domains), detector module 172 determines to use malicious domain detector 170 (e.g., predictive engine 174) to determine whether the particular domain is malicious.

In some embodiments, in response to determining that information indicating whether the domain is malicious (e.g., deemed malicious, likely be to be malicious, a reputational score corresponding to a likelihood that the domain is malicious) is not available, the system (e.g., detector module 172) determines to use malicious domain detector 170 (e.g., predictive engine 174) to determine whether the particular domain is malicious. For example, detector module 172 determines whether a previous determination of whether a domain is malicious is stored in cache (e.g., cache 178) or another storage system (e.g., a database storing a mapping of domains or domain information to an indication of whether the corresponding domain is malicious). In response to determining that the information indicating whether the domain is malicious was not previously determined and/or stored (e.g., in the cache), detector module 172 determines to use malicious domain detector 170 (e.g., predictive engine 174) to determine whether the particular domain is malicious. For example, detector module 172 requests prediction engine 174 to determine (e.g., predict) whether a domain is malicious. Conversely, in some embodiments, in response to determining that the domain was previously indicated to be malicious or previously determined by malicious domain detector 170 and/or is stored in the cache (e.g., cache 178), the previously determined indication of whether the domain is malicious is used such as in connection with enforcing one or more security policies for traffic to/from the domain.

Prediction engine 174 is used to predict whether a domain is malicious. In some embodiments, prediction engine 174 determines (e.g., predicts) whether a newly registered domain is malicious. Prediction engine 174 may proactively determine whether a domain is is malicious in response to receiving registration information for the domain. For example, in response to detector module 172 determining that malicious domain detector 170 is to be used to determine whether a particular domain is malicious (e.g., in response to receiving registration information for a newly registered domain or a set of newly registered domains), prediction engine 174 determines whether the newly registered domain is malicious. According to various embodiments, prediction engine 174 determines whether a newly registered domain is malicious based at least in part on the registration information. For example, prediction engine 174 applies a machine learning model to determine whether the newly registered domain is malicious. Applying the machine learning model to determine whether the newly registered domain is malicious may include prediction engine 174 querying machine learning model 176 (e.g., with the registration information for the domain). In some implementations, machine learning model 176 is pre-trained and prediction engine 174 does not need to provide a set of training domains to machine learning model 176 contemporaneous with a query for an indication/determination of whether a particular domain is malicious. In some embodiments, prediction engine 174 receives information associated with whether the domain is malicious (e.g., the newly registered domain is malicious). For example, prediction engine 174 receives a result of a determination or analysis by machine learning model 176. In some embodiments, prediction engine 174 receives, from machine learning model 176, an indication of a likelihood that the domain is malicious. In response to receiving the indication of the likelihood that the domain is malicious, prediction engine 174 determines (e.g., predicts) whether the domain is malicious based at least in part on the likelihood that the domain is malicious. For example, prediction engine 174 compares the likelihood that the domain is malicious to a likelihood threshold value. In response to a determination that the likelihood that the domain is malicious is greater than a likelihood threshold value, prediction engine 174 may deem (e.g., determine that) the domain to be malicious.

According to various embodiments, in response to prediction engine 174 determining that the newly registered domain is malicious, the system sends to a security entity an indication that the newly registered domain is malicious. For example, malicious domain detector 170 may send to a security entity (e.g., a firewall) or network node (e.g., a client) an indication that the newly registered domain is malicious. The indication that the newly registered domain is malicious may correspond to an update to a blacklist of domains (e.g., corresponding to malicious domains) such as in the case that the newly registered domain is deemed to be malicious, or an update to a whitelist of domains (e.g., corresponding to non-malicious domains) such as in the case that the newly registered domain is deemed to be benign.

Machine learning model 176 predicts whether a domain (e.g., a newly registered domain) is malicious based at least in part on a model. As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. According to various embodiments, machine learning model 176 uses a relationship and/or pattern of registration information for the domain (e.g., a newly registered domain or a set of newly registered domain) and/or a training set to estimate whether the domain is malicious, such as to predict a likelihood that the domain is malicious. For example, machine learning model 176 use a machine learning process to analyze a set of relationships between an indication whether a domain is malicious (or benign) and one or more attributes pertaining to a domain or registration information for the domain, and uses the set of relationships to generate a prediction model for predicting whether a particular domain is malicious. In some embodiments, in response to predicting that a particular domain is malicious, an association between the domain and the indication that the domain is malicious is stored such as at malicious domain detector 170 (e.g., cache 178). In some embodiments, in response to predicting a likelihood that a particular domain is malicious, an association between the domain and the likelihood that the domain is malicious is stored such as at malicious domain detector 170 (e.g., cache 178). Machine learning model 176 may provide the indication whether a newly registered domain is malicious, or a likelihood that the newly registered domain is malicious, to prediction engine 174. In some implementations, machine learning model 176 provides prediction engine 174 with an indication that the analysis by machine learning model 176 is complete and that the corresponding result (e.g., the prediction result) is stored in cache 178.

According to various embodiments, machine learning model 176 uses one or more features in connection with predicting whether a domain is malicious (or a likelihood that a domain is malicious). For example, machine learning model 176 may be trained using one or more features. Examples of the features used in connection with training/applying the machine learning model 176 include (a) a feature pertaining to a domain reputation such as a reputation of a TLD, (b) a feature pertaining to a domain registration reputation; (c) a feature pertaining to a nameserver reputation; (d) a feature pertaining to an email reputation such as a reputation of an email address or domain corresponding to a registration of a domain; (e) a feature pertaining to a reputation of a WHOIS server associated with a domain registration; (f) a feature pertaining to a reputation of a registrant associated with a domain registration; (g) a feature pertaining to a reputation corresponding to a registrant email associated with a domain registration; (h) a feature pertaining to a reputation corresponding to a registrant organization associated with a domain registration; (i) a feature pertaining to a reputation corresponding to an hour or time at which a domain is registered; (j) a feature pertaining to a reputation corresponding to a particular day of the week on which a domain is registered; (k) a feature pertaining to a reputation corresponding to an extracted associated with a domain registration; (l) a feature pertaining to a reputation corresponding to a domain of a registrant email associated with a domain registration; (m) a feature pertaining to a domain name length; (n) a feature pertaining to a similarity of a domain name to an Alexa domain; (o) a feature pertaining to a similarity of a domain to a set of common words, (p) a feature pertaining to a similarity of a domain to a set of known malicious domains, (q) a feature pertaining to date on which a domain registration is updated; (r) a feature pertaining to a number of domains updated on a same day to have the same nameserver, registrar, registrant email, registrant organization, and email. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

Cache 178 stores information pertaining to a domain. In some embodiments, cache 178 stores mappings of indications of whether a domain is malicious (or likely malicious) to domains. Cache 178 may store additional information pertaining to a set of domains such as registration information for domain(s) in the set of domains.

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32ylhkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Detecting and preventing DNS tunneling attacks is difficult for a variety of reasons. Many legitimate services (e.g., content delivery networks, web hosting companies, etc.) legitimately use the subdomain portion of a domain name to encode information to help support use of those legitimate services. The encoding patterns used by such legitimate services can vary widely among providers and benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious domains can efficiently and proactively be detected (e.g., shortly after registration of a domain), and security policies may be enforced with respect to traffic for malicious domains, such as to block traffic to/from such malicious domains.

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), it provides them to security platform 140 which performs both anomaly detection and similarity detection, respectively. In various embodiments, a domain (e.g., as provided in a query received by security platform 140) is classified as a malicious DNS tunneling root domain if either detector flags the domain.

In some embodiments, malicious domain detector 170 provides to a security entity, such as data appliance 102, an indication whether a newly registered domain is malicious. For example, in response to determining that the newly registered domain is malicious, malicious domain detector 170 sends an indication that the newly registered domain is malicious to data appliance 102, and the data appliance may in turn enforce one or more security policies based at least in part on the indication that the newly registered domain is malicious. As another example, in response to determining that the newly registered domain is malicious, malicious domain detector 170 provides to the security entity an update of a mapping of domains to indications of whether a corresponding domain is malicious, or an update to a blacklist for malicious domains (e.g., identifying malicious domains) or a whitelist for benign domains (e.g., identifying domains that are not deemed malicious).

Figure 2:
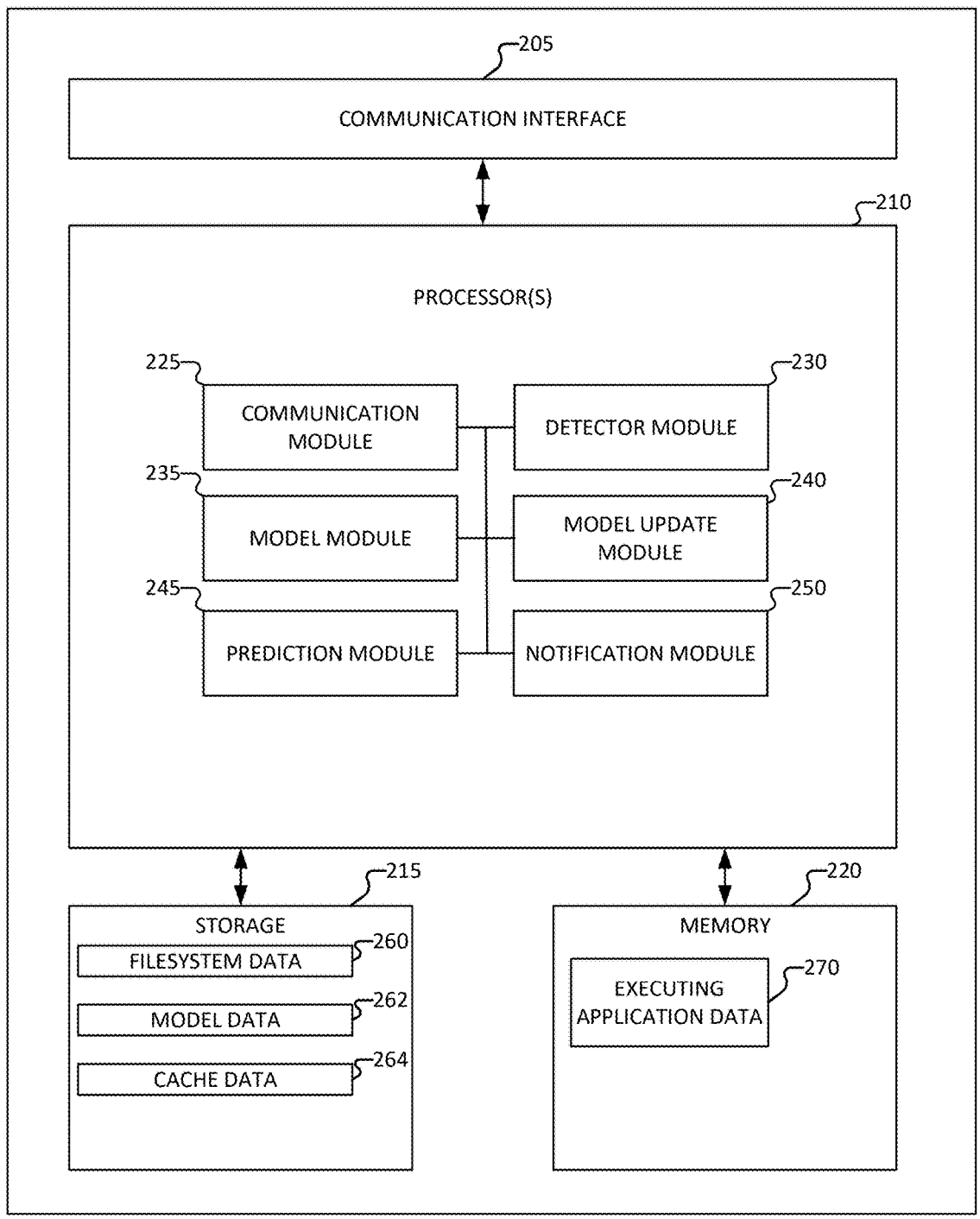
FIG. 2 is a block diagram of a system to detect a malicious newly registered domain according to various embodiments.

FIG. 2 is a block diagram of a system to detect a malicious newly registered domain according to various embodiments. According to various embodiments, system 200 is implemented in connection with system 100 of FIG. 1, such as for malicious domain detector 170. In various embodiments, system 200 is implemented in connection with system 300 of FIG. 3, features 700 of FIG. 7, process 800 of FIG. 8, process 900 of FIG. 9, and/or process 1000 of FIG. 10.

System 200 can be implemented by one or more devices such as servers. System 200 can be implemented at various locations on a network. For example, the malicious domain detector is deployed as a service, such as a web service. The service may be provided by a DNS resolver (e.g., the malicious domain detector is deployed on a remote server that monitors newly registered domains, determines whether a newly registered domain is malicious, and sends/pushes out notifications or updates pertaining to newly registered domains such as an indication whether a newly registered domain is malicious). As another example, the malicious domain detector is deployed on a firewall.

In the example shown, system 200 implements one or more modules in connection with predicting whether a domain (e.g., a newly registered domain) is malicious, determining a likelihood that the domain is malicious, and/or providing a notice or indication of whether a domain is malicious. System 200 comprises communication interface 205, one or more processors 210, storage 215, and/or memory 220. One or more processors 210 comprises one or more of communication module 225, detector module 230, model module 235, model update module 240, prediction module 245, and/or notification module 250.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated. As another example, communication interface 205 provides to communication module 225 information received by system 200. Communication module 225 is configured to receive registration information for one or more domains, such as from domain registrars, etc. Communication module 225 is configured to query third party service(s) (e.g., domain registrars or other services that expose registration information for domains) for registration information for domains. For example, system 200 may use communication module 225 to query the third party service (s). Communication module 225 is configured to receive one or more settings or configurations from an administrator. Examples of the one or more settings or configurations include configurations of a model (e.g., the machine learning model), an indication of a training set for the model, information pertaining to a whitelist of domains (e.g., domains that are not deemed suspicious and for which traffic or attachments are permitted), information pertaining to a blacklist of domains (e.g., domains that are deemed suspicious and for which traffic or attachments are to be restricted).

In some embodiments, system 200 comprises detector module 230. System 200 uses detector module 230 in connection with determining whether a domain is newly registered. For example, detector module 230 monitors registration information for domains and detects newly registered domains. In some implementations, detector module 230 corresponds to, or is similar to, detector module 172. Detector module 230 may query, via communication interface 205, a third party (e.g., a third party service) for registration information for newly registered domains (or a set of domains from which detector module 230 may determine which domains correspond to newly registered domains). Detector module 230 may query the third party at predetermined intervals (e.g., customer-specified intervals, etc.). As an example, detector module 230 may query the third party for registration information for newly registered domains daily (or daily during the business week). Detector module 230 may detect that a domain is newly registered contemporaneous with registration of the domain. For example, detector module 230 detects that a domain is newly registered shortly after such registration (e.g., within a week, less than 3 days, within a day, etc.). Registration information is generally made available within one day of a domain being registered. Accordingly, in some embodiments, detector module 230 detects a newly registered domain, and system 200 determines whether such newly registered domain is malicious with a day or a couple of days of the domain being registered.

In some embodiments, system 200 comprises model module 235. System 200 uses model module 235 to determine (e.g., predict) whether the newly registered domain is malicious. Model module 235 determines whether the newly registered domain is malicious is based at least in part on registration information for the newly registered domain (e.g., the registration information obtained/queried by detector module 230). According to various embodiments, model module 235 uses a model (e.g., a machine learning model) to determine whether the newly registered domain is malicious, or to determine a likelihood that the newly registered domain is malicious. System 200 can manage the model (e.g., the machine learning model) via model module 235. Model module 235 determines a model used to generate predictions on whether (or a likelihood the) the newly registered domain is malicious based at least in part on a machine learning process and one or more training sets. In some implementations, model module 235 corresponds to, or is similar to, machine learning model 176. Examples of information from the registration information that is used in connection with determining whether a newly registered domain is malicious include: the domain name (e.g., a root name, the string of characters in front of the top-level domain, etc.), a contract information associated with the domain (e.g., a name of an individual contact, an organization identified as an owner, an email address, a mailing address, a phone number, etc.), a date and/or time when the domain was registered, a day of the week that the domain was registered, etc. Various other information corresponding to the domain registration may be used in connection with predicting whether the newly registered domain is malicious. Model module 235 may use one or more features pertaining to such information from the registration information, or one or more attributes pertaining to the newly registered domain that are determined form such information. As an example, a feature pertaining to a reputation (e.g., an indication of an extent of maliciousness) of an attribute or the information obtained from registration information may be used to train/apply the model.

In some embodiment, model module 235 predicts a likelihood that a newly registered domain is malicious, or whether a newly registered domain is malicious, based at least in part on a similarity, or extent of a similarity, of the newly registered domain (or information or attributes associated with the registration of the newly registered domain) to historical domains deemed to be malicious and/or historical domains deemed to be benign.

According to various embodiments, model module 235 uses one or more machine learning processes in connection with predicting a likelihood that a newly registered domain is malicious, or whether a newly registered domain is malicious. In some embodiments, model module 235 implements a decision tree machine learning process/model. In some embodiments, model module 235 implements a random forest machine learning process/model. Various other models may be implemented. Examples of machine learning processes that can be implemented in connection with training the model include random forest, linear regression, support vector machine, naive Bayes, adaptive boosting, logistic regression, K-nearest neighbors, decision trees, gradient boosted decision trees, K-means clustering, hierarchical clustering, density-based spatial clustering of applications with noise (DBSCAN) clustering, principal component analysis, etc.

Examples of the features used in connection with training/applying the model include (a) a feature pertaining to a domain reputation such as a reputation of a TLD, (b) a feature pertaining to a domain registration (or a reputation thereof); (c) a feature pertaining to a nameserver (or a reputation thereof); (d) a feature pertaining to an email (or a reputation thereof) such as a reputation of an email address or domain corresponding to a registration of a domain; (e) a feature pertaining to a WHOIS server (or a reputation thereof) associated with a domain registration; (f) a feature pertaining to a registrant associated with a domain registration (or a reputation thereof); (g) a feature pertaining to a registrant email associated with a domain registration (or a reputation associated with such email); (h) a feature pertaining to a registrant organization associated with a domain registration (or a reputation associated with the organization); (i) a feature pertaining to an hour or time at which a domain is registered (or a reputation associated with the hour or time); (j) a feature pertaining to a particular day of the week on which a domain is registered (or a reputation thereof); (k) a feature pertaining to an extracted associated with a domain registration (or a reputation thereof); (l) a feature pertaining to a domain of a registrant email associated with a domain registration (or a reputation thereof); (m) a feature pertaining to a domain name length; (n) a feature pertaining to a similarity of a domain name to an Alexa domain; (o) a feature pertaining to a similarity of a domain to a set of common words, (p) a feature pertaining to a similarity of a domain to a set of known malicious domains, (q) a feature pertaining to date on which a domain registration is updated; (r) a feature pertaining to a number of domains updated on a same day to have the same nameserver, registrar, registrant email, registrant organization, and email. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

In some embodiments, system 200 comprises model update module 240. System 200 uses model update module 240 to update the model used to predict whether a newly registered domain is updated. Model update module 240 updates the model based at least in part one or more training sessions and/or feedback provided in response to system 200 providing predicted likelihoods or indications that a domain is malicious. Model update module 240 can be updated using records for one or more domains, such as domains deemed to be benign (e.g., google.com, Microsoft.com, apple.com, etc.) and/or domains deemed to be malicious.

According to various embodiments, model update module 240 obtains historical information pertaining to domains such as historical domains. A historical domain may be deemed to be a domain that is not (or is no longer) a newly registered domain. For example, a historical domain may be deemed to be a domain for which third party scoring/assessment of maliciousness is available. An example of the historical information associated with the historical domains indicating whether a particular domain is malicious corresponds to a VirusTotal® (VT) score. In the case of a VT score greater than 0 for a particular domain, the particular domain is deemed malicious by the third party service. In some embodiments, the historical information associated with the historical domains indicating whether a particular domain is malicious corresponds to a social score such as a community-based score or rating (e.g., a reputation score) indicating that a domain is malicious or likely to be malicious. The historical information (e.g., from a third party service, a community-based score) indicates whether other vendors or cyber security organizations deem the particular domain to be malicious. The model may be updated in response to new historical information pertaining to domains being received. For example, if a domain is registered on day 1, system 200 predicts a likelihood that a domain is malicious at day 2, and on day 30 historical information is generated or made available for such domain (e.g., a VT score is available or a communicate-based reputational score or assessment is provided), then when system 200 receives the historical information (e.g., on day 30 or a day sometime thereafter), model update module 240 may update the model based at least in part on a relationship/comparison between the prediction by model module 234 of whether the domain is malicious and the indication by the historical is information as to whether the domain is malicious.

In some embodiments, system 200 comprises prediction module 245. System 200 uses prediction module 245 to predict whether a newly registered domain is malicious, or to predict a likelihood that the newly registered domain is malicious. For example, prediction module 245 determines whether to use model module 235 in connection with predicting whether the newly registered domain is malicious. Prediction module 245 may determine to use model module 235 to obtain an indication of whether the newly registered domain is malicious based at least in part on a determination that detector module 230 has detected a newly registered domain (e.g., in response to detector module 230 determining that registration information received/monitored includes a newly registered domain). As an example, in response to determining to use model module 235 in connection with predicting whether a newly registered domain is malicious, prediction module 245 sends a query to model module 235 for prediction of whether the newly registered domain is malicious. In some implementations, prediction module 245 corresponds to, or is similar to, prediction engine 174 of system 100 of FIG. 1.

In some embodiments, system 200 comprises notification module 250. System 200 uses notification module 250 to provide an indication of whether the newly registered domain is malicious. For example, notification module 250 obtains an indication of whether the newly registered domain is malicious (or a likelihood that the newly registered domain is malicious) from prediction module 245 and provides the indication of whether the newly registered domain is malicious to one or more security entities. As another example, notification module 250 provides to one or more security entities (e.g., a firewall), nodes, or endpoints (e.g., a client terminal) an update to a whitelist of domains and/or blacklist of domains.

According to various embodiments, storage 215 comprises one or more of filesystem data 260, model data 262, and/or cache data 264. Storage 215 comprises a shared storage (e.g., a network storage system) and/or database data, and/or user activity data.

In some embodiments, filesystem data 260 comprises a database such as one or more datasets (e.g., one or more datasets for domain registrations, mappings of indicators of maliciousness to domains, mappings of indicators of benign domains to domains, etc.). Filesystem data 260 comprises data such as a dataset for training a machine learning process, historical information pertaining domain registration, a white list of domains deemed to be safe (e.g., not suspicious), a black list of domains corresponding to traffic deemed to be suspicious or malicious, information associated with suspicious or malicious traffic such as trends or relationships, information associated with secure or safe traffic such as trends or relationships, etc.

Model data 262 comprises data pertaining to one or more models. As an example, data pertaining to one or more models comprises relationships and associations between domains (e.g., top-level domains, subdomains, etc.) or domain registration information and indications or likelihoods that the domains are malicious or benign. Model data 262 can store information pertaining to one or more machine learning processes and/or configurations for the implementation of one or more machine learning processes to predict whether a newly registered domain is malicious.

Cache data 264 comprises information pertaining to predictions of whether a newly registered domain is malicious. As an example, predictive cache data 264 stores indications of whether one or more newly registered domains are malicious.

According to various embodiments, memory 220 comprises executing application data 270. Executing application data 270 comprises data obtained or used in connection with executing an application such as an application executing a machine learning process or for configuring a machine learning model. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious traffic, a document preparation application, a report preparation application, a user interface application, a data analysis application, an anomaly detection application, a user authentication application, a security policy management/update application, etc.).

Figure 3:
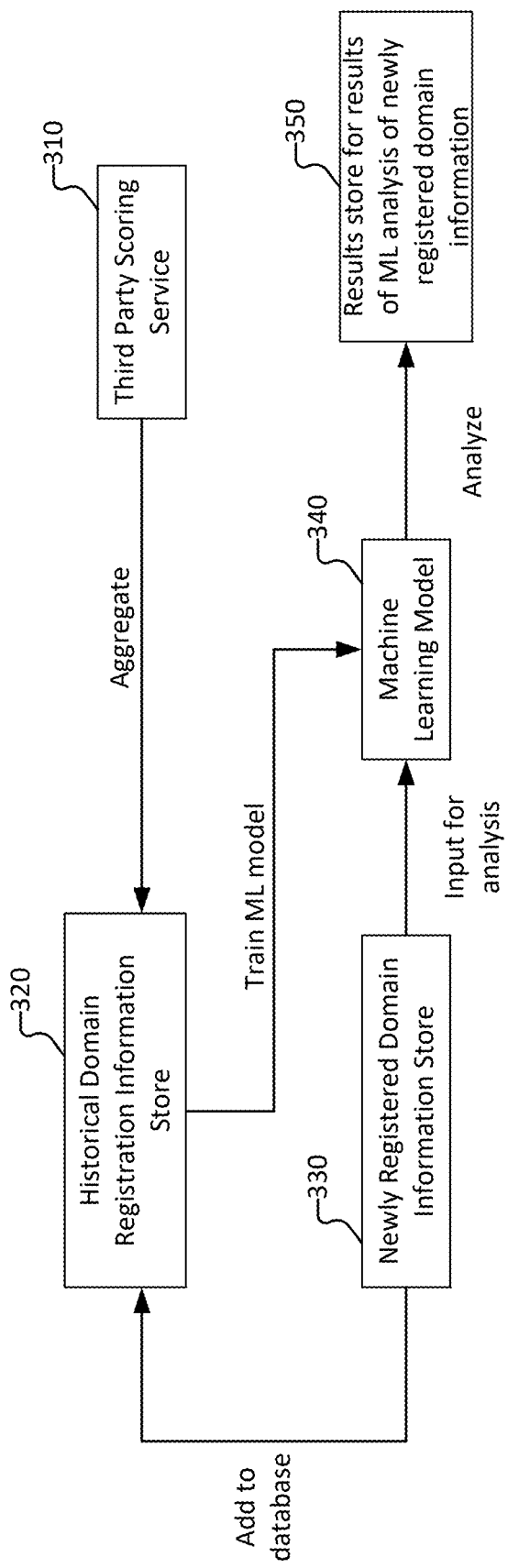
FIG. 3 is a diagram of a system for using a machine learning model to detect malicious newly registered domains according to various embodiments.

FIG. 3 is a diagram of a system for using a machine learning model to detect malicious newly registered domains according to various embodiments. According to various embodiments, system 300 is implemented in connection with system 100 of FIG. 1, such as for malicious domain detector 170. In various embodiments, system 300 is implemented in connection with system 200 of FIG. 2, features 700 of FIG. 7, process 800 of FIG. 8, process 900 of FIG. 9, and/or process 1000 of FIG. 10.

As illustrated in FIG. 3, system 300 comprises one or more of third party scoring service 310, historical domain registration information store 320, newly registered domain information store 330, machine learning model 340, and results store 350 for results of the machine learning analysis of newly registered domain information.

Third party scoring service 310 provides historical information pertaining to domains such as historical domains. A historical domain may be deemed to be a domain that is not (or is no longer) a newly registered domain. For example, a historical domain may be deemed to be a domain for which third party scoring/assessment of maliciousness is available. An example of the historical information associated with the historical domains indicating whether a particular domain is malicious corresponds to a VirusTotal® (VT) score. In the case of a VT score greater than 0 for a particular domain, the particular domain is deemed malicious by the third party service. In some embodiments, the historical information associated with the historical domains indicating whether a particular domain is malicious corresponds to a social score such as a community-based score or rating (e.g., a reputation score) indicating that a domain is malicious or likely to be malicious. Third party scoring service 310 provides to historical domain registration information store 320 historical information indicating whether other vendors or cyber security organizations deem the particular domain (or set of domains) to be malicious. Third party scoring service 310 may provide an update to the historical information (e.g., an update to a set of domains such as domains for which a score/assessment is that that time available) at a predefined interval, in response to a query from historical domain registration information store 320, and/or in response to a determination that the historical information is updated (e.g., third party scoring service 310 may push an update to historical domain registration information store 320).

In some embodiments, system 300 comprises historical domain registration information store 320. System 300 uses historical domain registration information store 320 stores information pertaining to historical domains. The information pertaining to historical domains can include one or more attributes associated with the historical domains, registration information for the historical domains, an indication of whether one or more of the historical domains are malicious, an indication of whether one or more of the historical domains are benign, reputational information for the historical domains (e.g., a reputational or community-based assessment or score), etc. Historical domain registration information store 320 may be implemented by one or more servers. As an example, historical domain registration information store 320 may comprise one or more databases (e.g., datasets).

In some embodiments, system 300 comprises newly registered domain information store 320. System 300 uses newly registered domain information store 320 to store information pertaining to one or more newly registered domains. Examples of information comprised in the registration information include a name of an owner, an owner contact information (e.g., mailing address) address, a date that the corresponding domain was registered, a company or organization associated with the owner, etc. Information stored in the newly registered domain information store 320 may be updated in response to a determination that a newly registered domain is registered (e.g., in response to receiving registration information for the newly registered domain(s)).

According to various embodiments, information stored in the newly registered domain information store 320 is provided to historical domain registration information store 320. For example, the information obtained from newly registered domain information store 320 is used to determine a set of domains for which system 300 is to obtain historical information (e.g., a third party assessment of whether a domain is malicious), such as when such historical information is available. System 300 may use the information obtained from newly registered domain information store 320 to determine a set of domains for which system 300 is to query third party scoring service 310 for historical information with which to update historical domain registration information store 320.

In some embodiments, system 300 comprises machine learning model 340. As illustrated in FIG. 3, machine learning model 340 obtains historical information from historical domain registration information stored 320 in connection with training the machine learning model, and obtains information for one or more newly registered domains in connection with determining (e.g., predicting) whether the one or more newly registered domains are malicious. For example, machine learning model 340 receives the information for one or more newly registered domains in connection with a request to determine whether one or more newly registered domains are malicious, such as in response to system 300 determining that a newly registered domain is detected.

The model may be updated in response to new historical information pertaining to domains being received. For example, if a domain is registered on day 1, system 300 predicts a likelihood that a domain is malicious at day 2, and on day 30 historical information is generated or made available for such domain (e.g., a VT score is available or a communicate-based reputational score or assessment is provided), then when system 300 receives the historical information (e.g., on day 30 or a day sometime thereafter), the model is updated based at least in part on a relationship/ comparison between the prediction by of whether the domain is malicious and the indication by the historical information as to whether the domain is malicious.

In response to analyzing registration information for the one or more newly registered domains (e.g., determining a prediction of whether a newly registered domain is malicious), system 300 provides the results of such analysis to results store 350 for storing results of a machine learning analysis of newly registered domain information. For example, system 300 provides the results store 350 with an indication of whether the newly registered domain is malicious, an indication of the likelihood that the newly registered domain is malicious, etc.

Figure 4A:
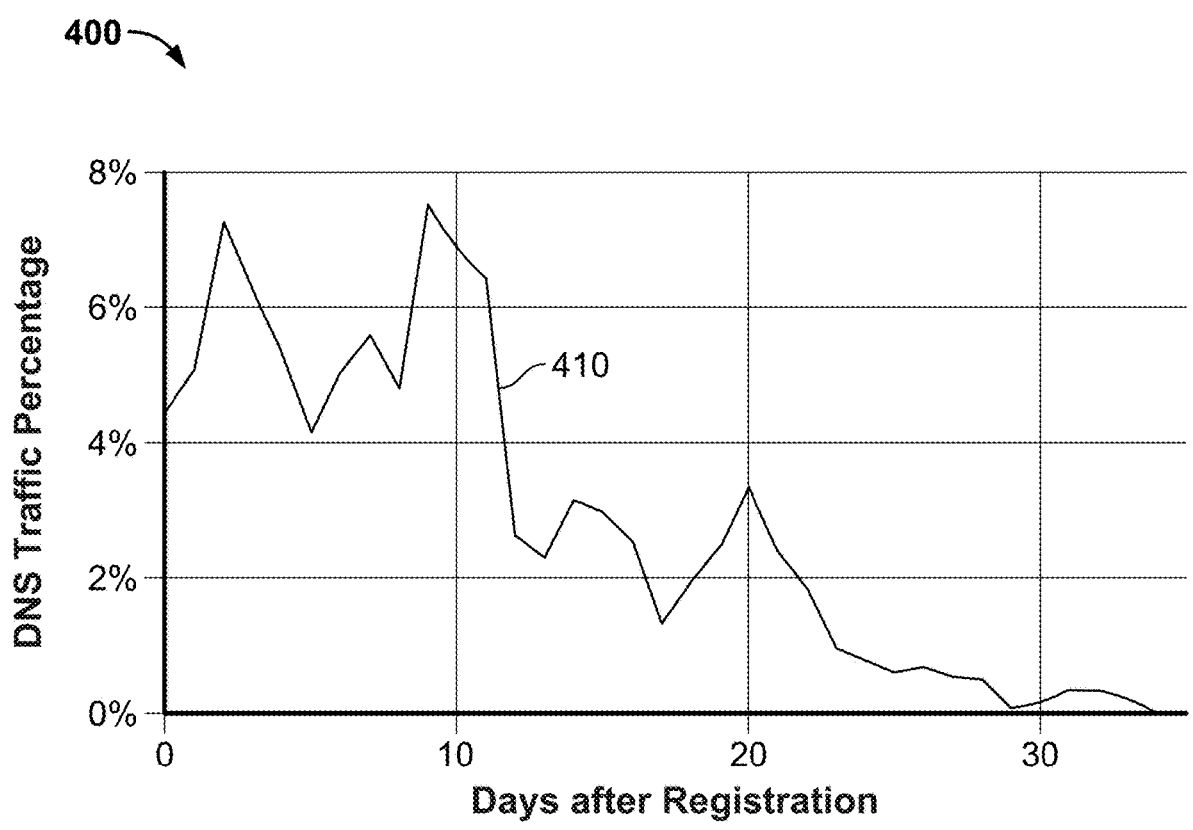
FIG. 4A is a graph illustrating detection of malicious newly registered domains according to various embodiments.

FIG. 4A is a graph illustrating detection of malicious newly registered domains according to various embodiments. In the example illustrated in chart 400, an indication of an amount of traffic for a particular domain 410 is plotted as a function of time such as a number of days after registration. Generally, the traffic with respect to a domain is highest in approximately the first ten days after registration of a domain, and thereafter the amount of traffic (e.g., the relative amount of traffic) drops the longer the domain is registered. For example, in chart 400 at 30 days after registration, the traffic with respect to the domain is significantly reduced (e.g., the amount of traffic is de minimis) relative to the amount of traffic when the domain was first registered. A reason for the precipitous drop in traffic for the domain may be the availability of historical information with respect to the domain, such as third party assessments as to the maliciousness of the domain. For example, around this time of very small traffic, historical information associated with the historical domains indicating whether a particular domain is malicious is generally available from third parties (e.g., a VirusTotal® (VT) score, a community-based reputational score or assessment, etc.). Accordingly, although historical information associated with a domain, such as third party scores/assessments of maliciousness may be effective in reducing exposure to malicious domains once such historical information is available, nefarious users are generally still able to use domains for malicious purposes before such historical information is available. Various embodiments proactively detect newly registered domains, and predict whether the newly registered domains are malicious (or likely to be malicious). For example, various embodiments proactively predict whether the newly registered domains are malicious before historical information such as third party score or assessments of maliciousness is available.

Figure 4B:
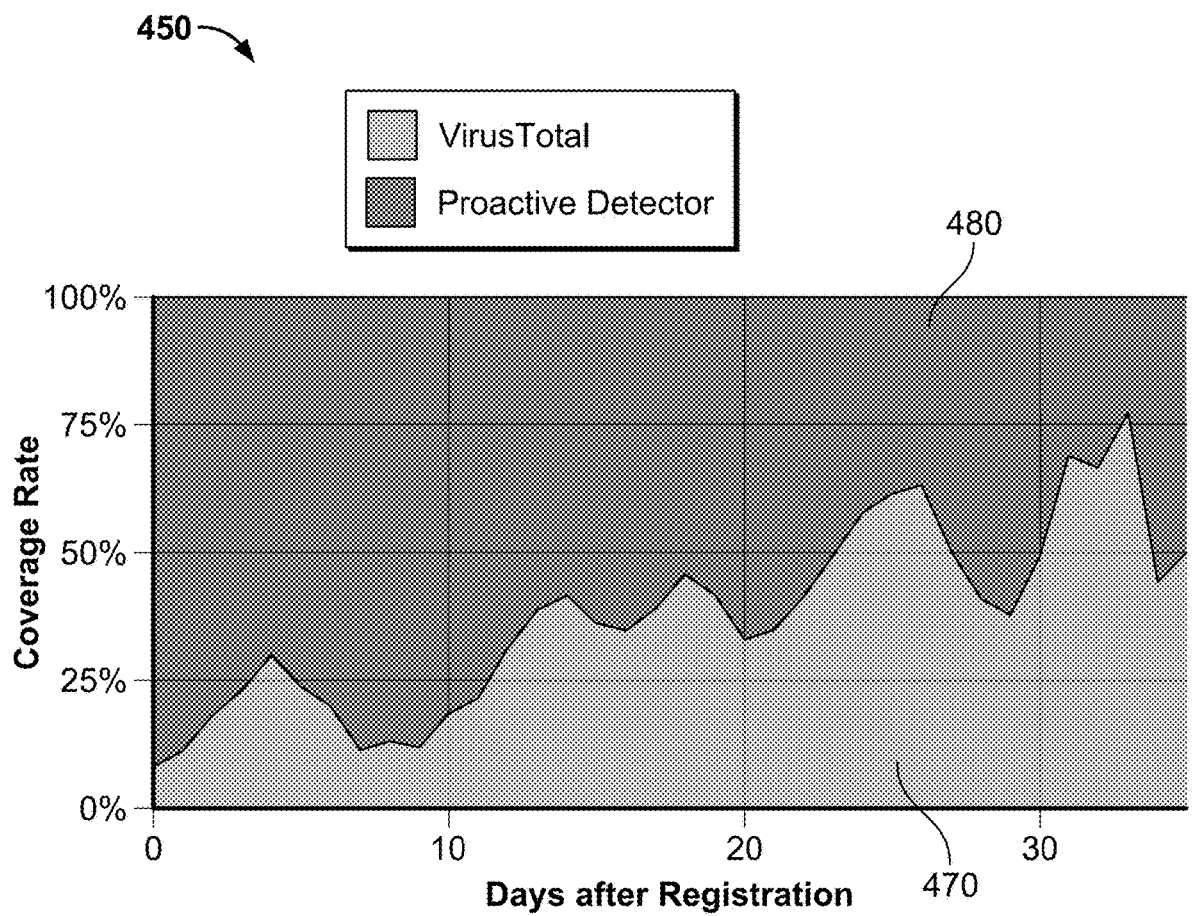
FIG. 4B is a graph illustrating detection of malicious newly registered domains according to various embodiments.

FIG. 4B is a graph illustrating detection of malicious newly registered domains according to various embodiments. In the example illustrated in chart 450, a coverage rate of whether malicious domains are identified or traffic with respect to domains is covered as a function of time such as a number of days after the corresponding date is registered. As illustrated in the shaded area corresponding to reference number 470, third party scores or assessments such as a VirusTotal® score provides more coverage as a number of days after registration increases. In contrast, the shaded area correspond to reference numeral 480 corresponding to coverage by use of a proactive detector such as various embodiments disclosed herein (e.g., a malicious domain detector 170, system 200, etc.) provides a significantly greater coverage rate with respect to a domain when a domain is newly registered (e.g., before historical information is available).

Figure 5:
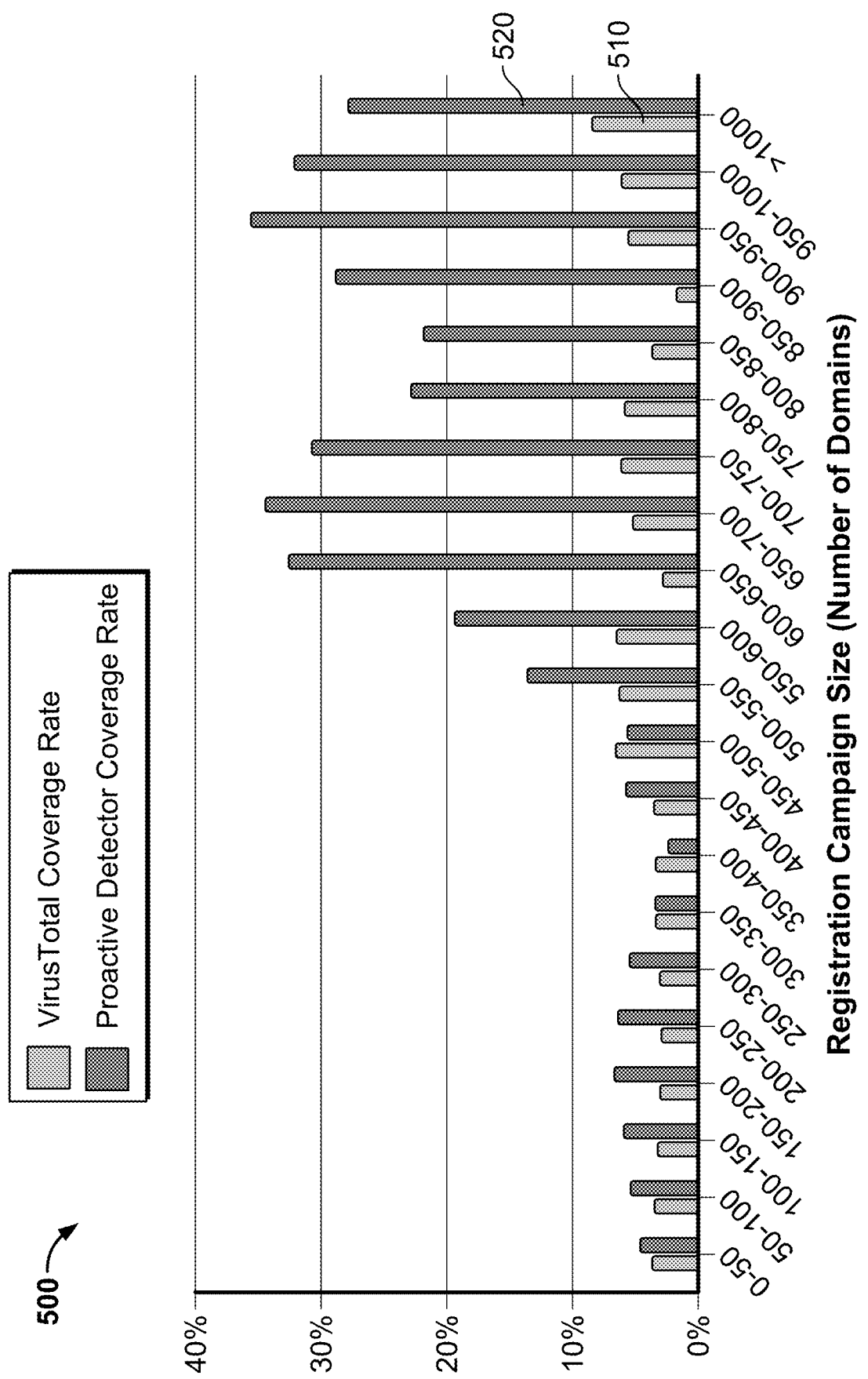
FIG. 5 is a chart illustrating a rate for detecting malicious newly registered domains according to various embodiments.

FIG. 5 is a chart illustrating a rate for detecting malicious newly registered domains according to various embodiments. In the example shown, chart 500 provides an illustration of a coverage rate by third party scores or assessments 510 or a proactive detector according to various embodiments 520 as a function of a number of domains registered in connection with a domain registration campaign such as by a nefarious user. As illustrated in chart 500, as the registration campaign size increases (e.g., as the number of domains registered exceeds 500 domains), a proactive detector according to various embodiments (e.g., a malicious domain detector 170, system 200, etc.) provides a significantly greater coverage (e.g., identification and protection against malicious domains) than third party scores or assessments such as a VirusTotal®.

Figure 6:
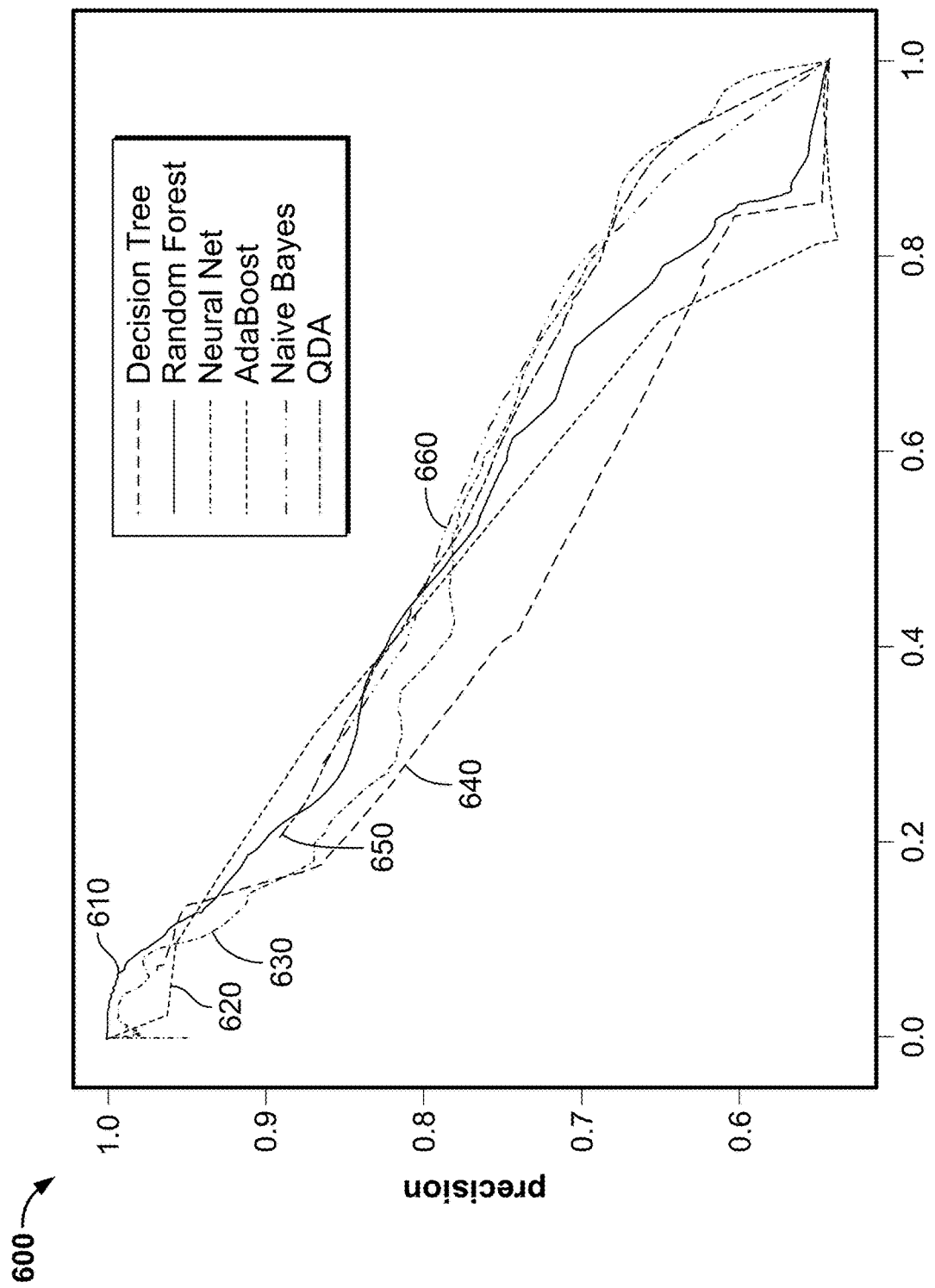
FIG. 6 is a graph illustrating relative precision of models used to detect malicious newly registered domains according to various embodiments.

FIG. 6 is a graph illustrating relative precision of models used to detect malicious newly registered domains according to various embodiments. In the example shown, chart 600 provides illustrates a precision of a proactive detector according to various embodiments (e.g., a malicious domain detector 170, system 200, etc.) according to a type of machine learning process used in connection with predicting whether a domain (e.g., a newly registered domain) is malicious. Reference numeral 610 illustrates a prediction of a random forest process. Reference numeral 620 illustrates a prediction of an adaptive boost process. Reference numeral 630 illustrates a prediction of a neural net process. Reference numeral 640 illustrates a prediction of a decision tree process. Reference numeral 650 illustrates a prediction of a decision tree process.

FIG. 7 is a table of features used in connection with detecting a malicious newly registered domain according to various embodiments. In the example shown, table 700 illustrates a set of features that are used in connection with training and/or applying a machine learning model in connection with determining whether a newly registered domain is malicious and/or to determine a likelihood that a newly registered domain is malicious, etc.

According to various embodiments, a set of features are used to train or apply a machine learning model in connection with determining whether a newly registered domain is malicious. In some embodiments, different weightings can be used for various the features in the set of the features. For example, table 700 includes weights w1, w2, w3 . . . w13, and w14 associated with the various features in the set of features. The weights may be determined based at least in part on a training of the machine learning model. In some embodiments, the weights may be set based on an input from an administrator or developer. For example, the weights may be set based on a setting of an accuracy or sensitivity of the machine learning model.

In some embodiments, the set of one or more features used in connection with training a model is the same set of one or more features used in connection with deployment of the model. Examples of the features used in connection with training/applying the model include (a) a feature pertaining to a domain reputation such as a reputation of a TLD, (b) a feature pertaining to a domain registration (or a reputation thereof); (c) a feature pertaining to a nameserver (or a reputation thereof); (d) a feature pertaining to an email (or a reputation thereof) such as a reputation of an email address or domain corresponding to a registration of a domain; (e) a feature pertaining to a WHOIS server (or a reputation thereof) associated with a domain registration; (f) a feature pertaining to a registrant associated with a domain registration (or a reputation thereof); (g) a feature pertaining to a registrant email associated with a domain registration (or a reputation associated with such email); (h) a feature pertaining to a registrant organization associated with a domain registration (or a reputation associated with the organization); (i) a feature pertaining to an hour or time at which a domain is registered (or a reputation associated with the hour or time); (j) a feature pertaining to a particular day of the week on which a domain is registered (or a reputation thereof); (k) a feature pertaining to an extracted associated with a domain registration (or a reputation thereof); (l) a feature pertaining to a domain of a registrant email associated with a domain registration (or a reputation thereof); (m) a feature pertaining to a domain name length; (n) a feature pertaining to a similarity of a domain name to an Alexa domain; (o) a feature pertaining to a similarity of a domain to a set of common words, (p) a feature pertaining to a similarity of a domain to a set of known malicious domains, (q) a feature pertaining to date on which a domain registration is updated; (r) a feature pertaining to a number of domains updated on a same day to have the same nameserver, registrar, registrant email, registrant organization, and email. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

Figure 8:
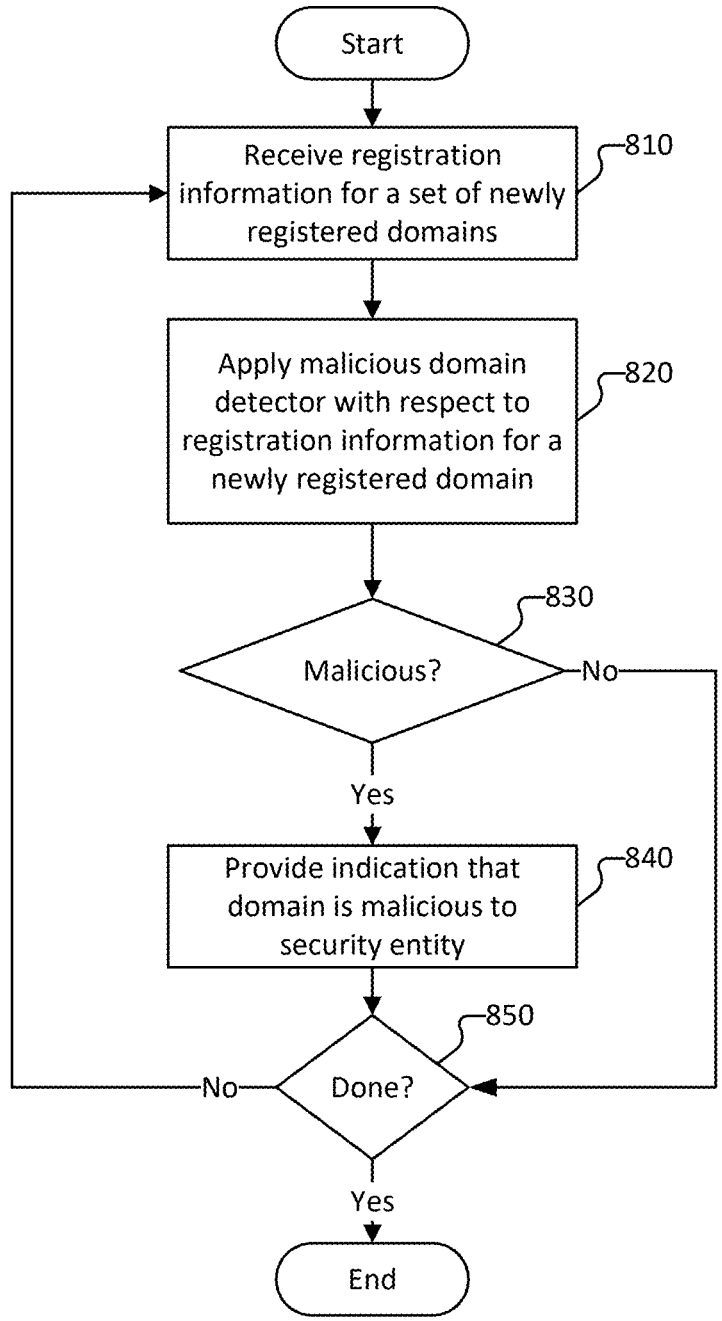
FIG. 8 is a flow diagram of a method for detecting a malicious newly registered domain according to various embodiments.

FIG. 8 is a flow diagram of a method for detecting a malicious newly registered domain according to various embodiments. According to various embodiments, process 800 is implemented in connection with system 100 of FIG. 1, system 200 of FIG. 2, and/or system 300 of FIG. 3.

At 810, registration information for a set of newly registered domains is received. In some embodiments, the system receives the registration information from a registrar or from a third party service (e.g., a service that publishes or makes available WHOIS records for domains). In some embodiments, the system obtains registration information for a newly registered domain (e.g., the WHOIS record) upon, or shortly after, the registration information is available to the public (e.g., is published such as by the registrant). For example, the system obtains the registration information for a particular domain on the order of days from the date of registration of the domain. A WHOIS record is generally publicly available within one day of a domain being registered. In some embodiments, the system monitors registrations (e.g., domain registrations) for a newly registered domain. For example, determining that a newly registered domain is registered includes monitoring registration of one or more domains, and detecting that the newly registered domain is registered based at least in part on the monitoring the registrations of one or more domains. As an example, the monitoring registration of one or more domains includes receiving a list of domains that are newly registered. In some embodiments, the system obtains WHOIS data at predetermined intervals or a predetermined frequency. For example, the system obtains WHOIS data daily (e.g., seven days a week, or on business days, etc.). In some embodiments, the system queries for new registration data (e.g., the system queries for new WHOIS records daily). In some embodiments, a third party service pushes WHOIS records for newly registered domains to the system.

At 820, a malicious domain detector is applied with respect to the registration information for a newly registered domain. In response to determining that registration information is received for a set of newly registered domains, the system determines whether to determine whether apply a malicious domain detector with respect to a domain within the set of newly registered domains. For example, the system selects a newly registered domain from among the set of newly registered domains for which the system determines to predict whether the newly registered domain is malicious (or to determine a predicted likelihood that the newly registered domain is malicious).

In response to determining a newly registered domain for which to predict whether a newly registered domain is malicious, the system provides information pertaining to the newly registered domain (e.g., the registration information, a subset of the registration information, an attribute pertaining to the registration, etc.) to a malicious domain detector, or invokes the malicious domain detector to analyze the information pertaining to the newly registered domain.

According to various embodiments, the system may use the registration information for a domain in connection with determining determine whether a newly registered domain is malicious (or is likely to be malicious). In some embodiments, the system predicts whether a domain is malicious based at least in part on the registration information. According to various embodiments, the system proactively predicts whether a domain is malicious such as before historical information (e.g., indicating whether the particular domain is malicious) is available (e.g., from a third party service, etc.). For example, in response to receiving the registration for a domain, the system uses a machine learning model (e.g., a machine learning process) to determine (e.g., predict) whether a domain is malicious.

In some embodiments, the system obtains a likelihood (e.g., a predicted likelihood) that a newly registered domain is malicious based at least in part on the analysis of (e.g., the use of the machine learning model to analyze) the one or more attributes of the domain and/or registration information pertaining to the domain. The system may deem the newly registered domain to be malicious (e.g., a malicious domain) in response to a determination that likelihood that a newly registered domain is malicious exceeds a threshold value (e.g., a likelihood threshold value). The threshold value may be configurable, such as by an administrator (e.g., an administrator of a service that provides predictions/determinations of whether domains, such as newly registered domains, are malicious), or a customer of a service that provides the predictions/determinations of whether domains are malicious (e.g., an administrator of the customer). As an example, the likelihood threshold value is 85% likelihood that the domain is malicious. As another example, the likelihood threshold value is 90% likelihood that the domain is malicious. As another example, the likelihood threshold value is 95% likelihood that the domain is malicious. As another example, the likelihood threshold value is 99% likelihood that the domain is malicious. Various other threshold values may be implemented. In some embodiments, the likelihood that the newly registered domain is malicious is determined based at least in part on a degree of similarity between the newly registered domain and one or more other malicious domains. In some embodiments, the likelihood that the newly registered domain is malicious is determined based at least in part on a degree of similarity between the newly registered domain and one or more domains that are deemed benign.

According to various embodiments, the system applies a malicious domain detector in connection with determining whether the newly registered domain is malicious. The applying malicious domain detector in connection with determining whether the newly registered domain is malicious may include applying a machine learning model to determine whether the newly registered domain is malicious. In some embodiments, the machine learning model is trained based at least in part on one or more domain registrations. For example, the machine learning model is trained using the historical information for the one or more domains (e.g., the third party indication whether the domain is malicious such as from a third party service, a community-based score, etc.). As another example, the machine learning model is trained based at least in part on one or more attributes associated with the one or more domain registrations.

At 830, a determination is made as to whether the newly registered domain is malicious. In some embodiments, in response to analyzing the newly registered domain (e.g., information pertaining to the newly registered domain), the system determines whether the newly registered domain is malicious. For example, the system determines a result of the analysis of the newly registered domain. In the case that the system uses a malicious domain detector to analyze the information pertaining to the newly registered domain, the system determines whether the newly registered domain is malicious based on a result returned from the malicious domain detector.

In some embodiments, the system obtains a likelihood (e.g., a predicted likelihood) that a newly registered domain is malicious based at least in part on the analysis of (e.g., the use of the machine learning model to analyze) the one or more attributes of the domain and/or registration information pertaining to the domain. The system may deem the newly registered domain to be malicious (e.g., a malicious domain) in response to a determination that likelihood that a newly registered domain is malicious exceeds a threshold value (e.g., a likelihood threshold value). The threshold value may be configurable, such as by an administrator (e.g., an administrator of a service that provides predictions/determinations of whether domains, such as newly registered domains, are malicious), or a customer of a service that provides the predictions/determinations of whether domains are malicious (e.g., an administrator of the customer). As an example, the likelihood threshold value is 85% likelihood that the domain is malicious. As another example, the likelihood threshold value is 90% likelihood that the domain is malicious. As another example, the likelihood threshold value is 95% likelihood that the domain is malicious. As another example, the likelihood threshold value is 99% likelihood that the domain is malicious. Various other threshold values may be implemented. In some embodiments, the likelihood that the newly registered domain is malicious is determined based at least in part on a degree of similarity between the newly registered domain and one or more other malicious domains. In some embodiments, the likelihood that the newly registered domain is malicious is determined based at least in part on a degree of similarity between the newly registered domain and one or more domains that are deemed benign.

In response to determining that the newly registered domain is malicious at 830, process 800 proceeds to 840 at which an indication that the newly registered domain is provided to a security entity. For example, the system may send to a security entity (e.g., a firewall) or network node (e.g., a client) an indication that the newly registered domain is malicious. The indication that the newly registered domain is malicious may correspond to an update to a blacklist of domains (e.g., corresponding to malicious domains). In some embodiments, in response to determining that the newly registered domain is malicious, the system pushes the indication that the newly registered domain is malicious or an update to a blacklist.

In response to determining that the newly registered domain is not malicious at 830, process 800 proceeds to 850. In some embodiments, in response to determining that the newly registered domain is not malicious, an update to a whitelist of domains or an indication that a domain is not malicious is provided to a security entity, and the security entity enforces one or more security policies with respect to traffic to/from the domain based on the indication that the domain is not malicious.

At 850, a determination is made as to whether process 800 is complete. In some embodiments, process 800 is determined to be complete in response to a determination that no further newly registered domains are to be analyzed (e.g., no further predictions for newly registered domains are needed), an administrator indicates that process 800 is to be paused or stopped, etc. In response to a determination that process 800 is complete, process 800 ends. In response to a determination that process 800 is not complete, process 800 returns to 810.

Figure 9:
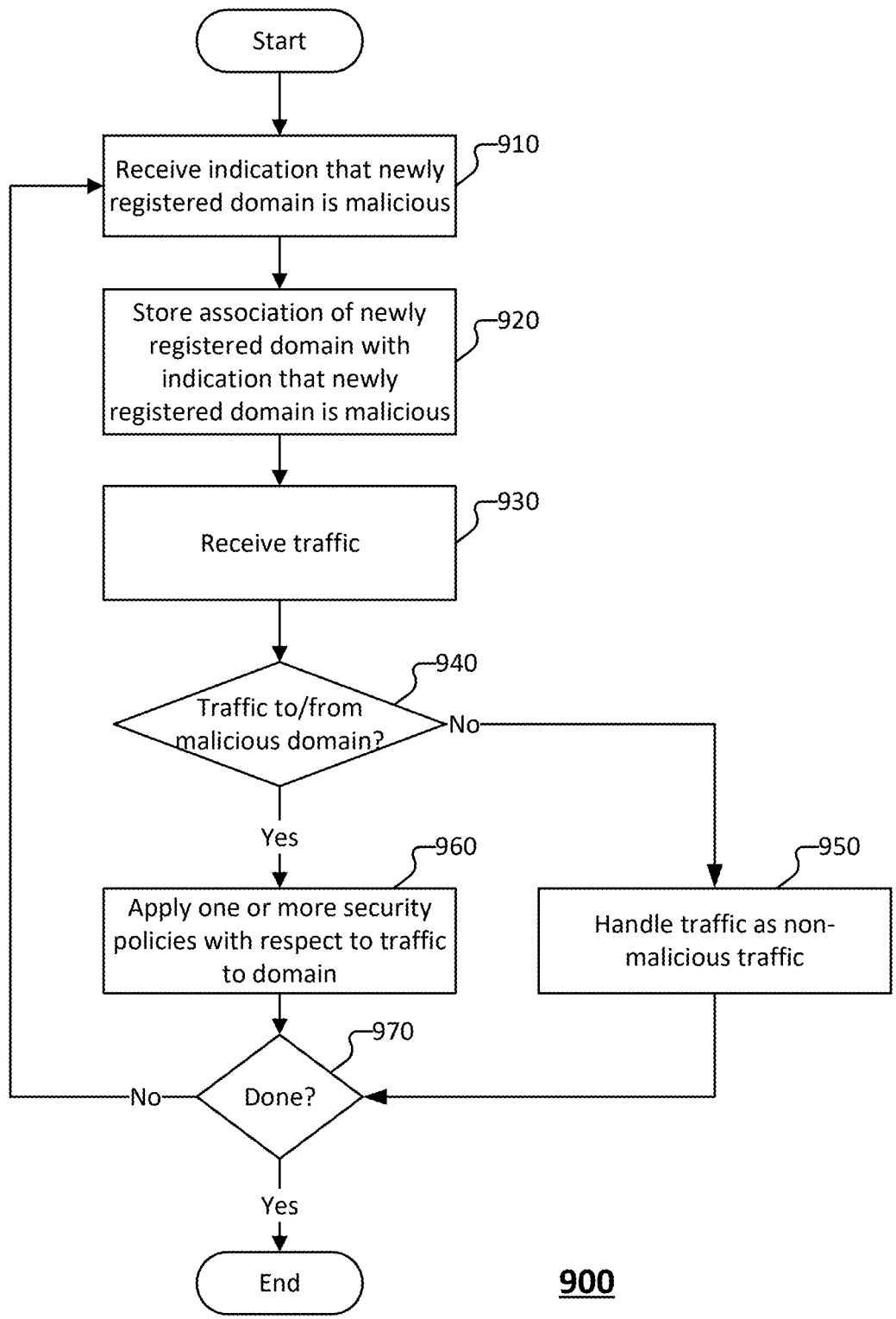
FIG. 9 is a flow diagram of a method for handling traffic according to various embodiments.

FIG. 9 is a flow diagram of a method for handling traffic according to various embodiments. According to various embodiments, process 900 is implemented in connection with system 100 of FIG. 1, system 200 of FIG. 2, and/or system 300 of FIG. 3. In some embodiments, process 900 is implemented by a security entity such as a firewall, etc.

At 910, an indication that a newly registered domain is malicious is received. In some embodiments, the system receives indication that a newly registered domain is malicious from a remote service (e.g., a cloud service, etc.). As an example, the remote service may use a malicious domain detector to determine (e.g., predict) whether a newly registered domain is malicious. The malicious domain detector may include machine learning model/process to analyze a newly registered domain and/or registration information pertaining to the newly registered domain to determine whether a newly registered domain is malicious. In response to the remote service determining that a newly registered domain is malicious (or is likely to be malicious), the system receives the indication that the newly registered domain is malicious. In some embodiments, the indication that the newly registered domain is malicious includes an update to a blacklist of domains, etc.

At 920, an association between the newly registered domain and the indication that the newly registered domain is malicious is stored. In response to receiving the indication that the newly registered domain is malicious, the system stores the indication that the newly registered domain is malicious in association with the domain. As an example, the system updates a mapping of domains to indications of whether the domains are malicious. As another example, the system updates a blacklist such as a list of domains that are malicious or for which certain elements of a security policy are to be enforced.

At 930, traffic is received. In some embodiments, the system intercepts (or receives a copy of) traffic that is incoming or outgoing with respect a particular network. As an example, the network may be a corporate network or another network for which security is monitored and/or managed.

At 940, a determination of whether traffic is with respect to a malicious domain is made. In some embodiments, the system determines whether the traffic is directed to or received from a malicious domain (e.g., a blacklist, a domain deemed to be malicious based on an indication provided by a remote service, etc.). As an example, in response to receiving the traffic, the system compares the domain to domains on a blacklist or domains that are mapped to an association that the domain is malicious.

In response to determining that the traffic is not with respect to a malicious domain at 940, process 900 proceeds to 950 at which the traffic is handled as non-malicious traffic. In some embodiments, the system enforces one or more security policies with respect to the traffic in the context of the traffic being non-malicious. As an example, the system permits the traffic to be routed normally.

In response to determining that the traffic is with respect to a malicious domain at 940, process 900 proceeds to 960 at which the traffic is handled as malicious traffic. In some embodiments, the system enforces one or more security policies with respect to the traffic in the context of the traffic being malicious. In some embodiments, the system blocks incoming traffic from, and/or outgoing traffic to, the newly registered domain. In some embodiments, the system provides an alert in response to incoming from, and/or outgoing traffic to, the newly registered domain. For example, the alert may be provided to a customer such as a customer administrator, a device on a customer network, and/or a device managed by a customer. In some embodiments, the system flags incoming traffic from, and/or outgoing traffic to, the newly registered domain.

At 970, a determination is made as to whether process 900 is complete. In some embodiments, process 900 is determined to be complete in response to a determination that no further traffic is to be analyzed (e.g., no further predictions for newly registered domains are needed), an administrator indicates that process 900 is to be paused or stopped, etc. In response to a determination that process 900 is complete, process 900 ends. In response to a determination is that process 900 is not complete, process 900 returns to 910.

Figure 10:
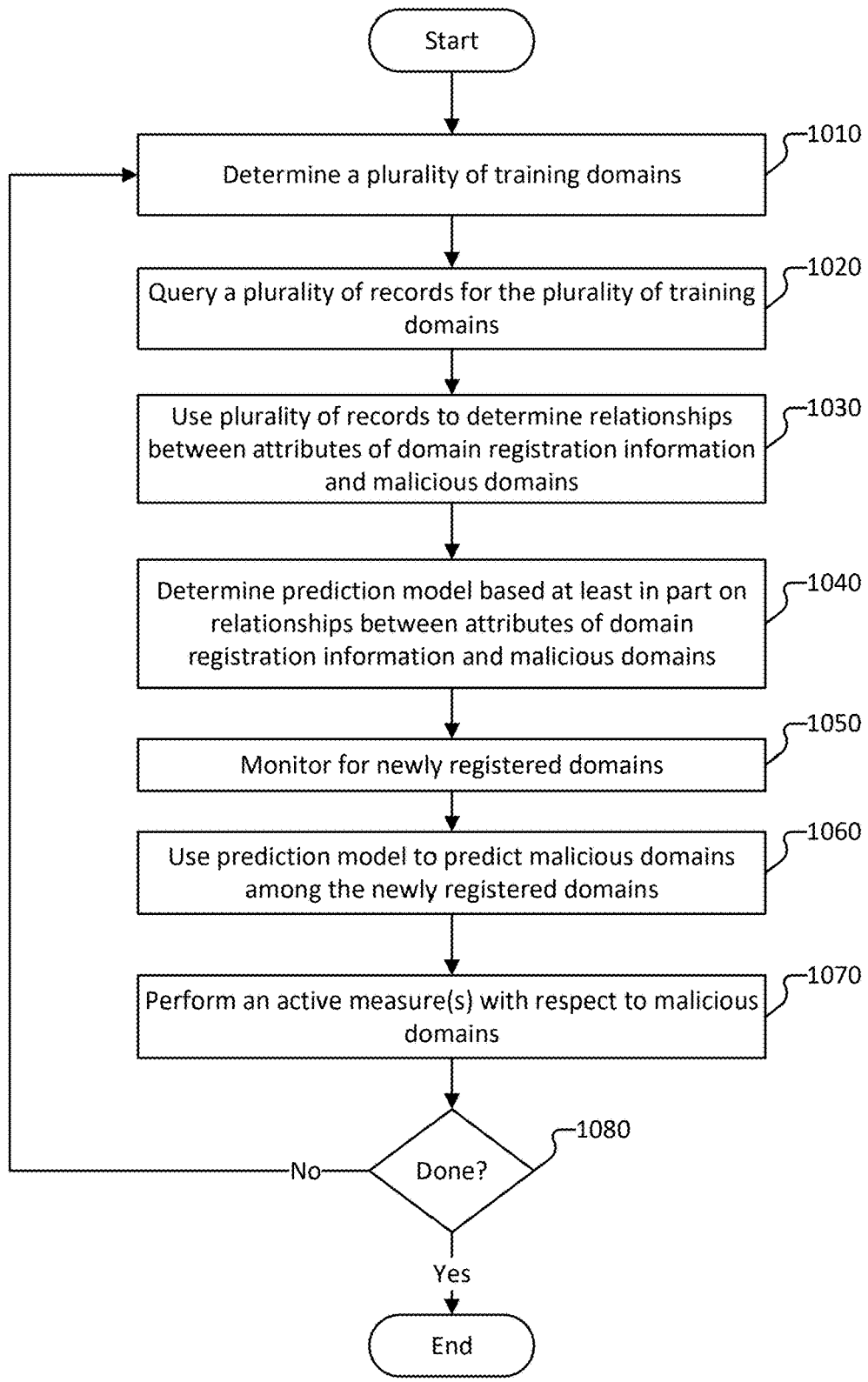
FIG. 10 is a flow diagram of a method for determining a machine learning model to predict malicious newly registered domains according to various embodiments.

FIG. 10 is a flow diagram of a method for determining a machine learning model to predict malicious newly registered domains according to various embodiments. According to various embodiments, process 800 is implemented in connection with system 100 of FIG. 1, system 200 of FIG. 2, and/or system 300 of FIG. 3.

At 1010, a plurality of training domains is determined. The plurality of training domains may correspond to a set of historical domains such as domains for which historical information is available (e.g., scores or assessments of maliciousness of the domains is available from third party services, etc.).

At 1020, a plurality of records for the plurality of training domains is queried. In some embodiments, the system obtains (e.g., queries) WHOIS records for the plurality of training domains. In some embodiments, the system obtains historical information pertaining to domains such as historical domains. An example of the historical information associated with the historical domains indicating whether a particular domain is malicious corresponds to a VirusTotal® (VT) score. In the case of a VT score greater than 0 for a particular domain, the particular domain is deemed malicious by the third party service. In some embodiments, the historical information associated with the historical domains indicating whether a particular domain is malicious corresponds to a social score such as a community-based score or rating (e.g., a reputation score) indicating that a domain is malicious or likely to be malicious. The historical information (e.g., from a third party service, a community-based score) indicates whether other vendors or cyber security organizations deem the particular domain to be malicious.

At 1030, a plurality of records are used to determine relationships between attributes of domain name registration and malicious domains. In some embodiments, the system determines correlations between various attributes of a domain or domain registration and malicious domains or benign domains. According to various embodiments, the system determines (or obtains) one or more features.

According to various embodiments, the system uses one or more features in connection with predicting whether a domain is malicious (or a likelihood that a domain is malicious). For example, the prediction model may be trained using one or more features. Examples of the features used in connection with training/applying the prediction model include (a) a feature pertaining to a domain reputation such as a reputation of a TLD, (n) a feature pertaining to a domain registration reputation; (c) a feature pertaining to a nameserver reputation; (d) a feature pertaining to an email reputation such as a reputation of an email address or domain corresponding to a registration of a domain; (e) a feature pertaining to a reputation of a WHOIS server associated with a domain registration; (f) a feature pertaining to a reputation of a registrant associated with a domain registration; (g) a feature pertaining to a reputation corresponding to a registrant email associated with a domain registration; (h) a feature pertaining to a reputation corresponding to a registrant organization associated with a domain registration; (i) a feature pertaining to a reputation corresponding to an hour or time at which a domain is registered; (j) a feature pertaining to a reputation corresponding to a particular day of the week on which a domain is registered; (k) a feature pertaining to a reputation corresponding to an extracted associated with a domain registration; (l) a feature pertaining to a reputation corresponding to a domain of a registrant email associated with a domain registration; (m) a feature pertaining to a domain name length; (n) a feature pertaining to a similarity of a domain name to an Alexa domain; (o) a feature pertaining to a similarity of a domain to a set of common words, (p) a feature pertaining to a similarity of a domain to a set of known malicious domains, (q) a feature pertaining to date on which a domain registration is updated; (r) a feature pertaining to a number of domains updated on a same day to have the same nameserver, registrar, registrant email, registrant organization, and email. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

At 1040, a prediction model is determined based at least in part on relationships between attributes of domain registration and malicious domains. In some embodiments, the system trains the prediction model based at least in part on the attributes for the plurality of training domains. For example, the prediction may model may be a machine learning model that uses the features determined based at in part on the registration information for the plurality of training domains and historical information pertaining the plurality of training domains (e.g., third party scores or assessments such as a corresponding VirusTotal® score, a community-based reputational score, etc.).

The prediction model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc.

At 1050 newly registered domains are monitored. In some embodiments, the system receives the registration information from a registrar or from a third party service (e.g., a service that publishes or makes available WHOIS records for domains). In some embodiments, the system obtains registration information for a newly registered domain (e.g., the WHOIS record) upon, or shortly after, the registration information is available to the public (e.g., is published such as by the registrant). For example, the system obtains the registration information for a particular domain on the order of days from the date of registration of the domain. A WHOIS record is generally publicly available within one day of a domain being registered. In some embodiments, the system monitors registrations (e.g., domain registrations) for a newly registered domain. For example, determining that a newly registered domain is registered includes monitoring registration of one or more domains, and detecting that the newly registered domain is registered based at least in part on the monitoring the registrations of one or more domains. As an example, the monitoring registration of one or more domains includes receiving a list of domains that are newly registered. In some embodiments, the system obtains WHOIS data at predetermined intervals or a predetermined frequency. For example, the system obtains WHOIS data daily (e.g., seven days a week, or on business days, etc.). In some embodiments, the system queries for new registration data (e.g., the system queries for new WHOIS records daily). In some embodiments, a third party service pushes WHOIS records for newly registered domains to the system.

At 1060, the prediction model is used to predict malicious domains among the newly registered domains. In response to determining that registration information is received for a set of newly registered domains, the system determines whether to determine whether apply a malicious domain detector with respect to a domain within the set of newly registered domains. For example, the system selects a newly registered domain from among the set of newly registered domains for which the system determines to predict whether the newly registered domain is malicious (or to determine a predicted likelihood that the newly registered domain is malicious).

In response to determining a newly registered domain for which to predict whether a newly registered domain is malicious, the system provides information pertaining to the newly registered domain (e.g., the registration information, a subset of the registration information, an attribute pertaining to the registration, etc.) to a malicious domain detector, or invokes the malicious domain detector to analyze the information pertaining to the newly registered domain.

According to various embodiments, the system may use the registration information for a domain in connection with determining determine whether a newly registered domain is malicious (or is likely to be malicious). In some embodiments, the system predicts whether a domain is malicious based at least in part on the registration information. According to various embodiments, the system proactively predicts whether a domain is malicious such as before historical information (e.g., indicating whether the particular domain is malicious) is available (e.g., from a third party service, etc.). For example, in response to receiving the registration for a domain, the system uses a machine learning model (e.g., a machine learning process) to determine (e.g., predict) whether a domain is malicious.

In some embodiments, the system obtains a likelihood (e.g., a predicted likelihood) that a newly registered domain is malicious based at least in part on the analysis of (e.g., the use of the machine learning model to analyze) the one or more attributes of the domain and/or registration information pertaining to the domain. The system may deem the newly registered domain to be malicious (e.g., a malicious domain) in response to a determination that likelihood that a newly registered domain is malicious exceeds a threshold value (e.g., a likelihood threshold value). The threshold value may be configurable, such as by an administrator (e.g., an administrator of a service that provides predictions/determinations of whether domains, such as newly registered domains, are malicious), or a customer of a service that provides the predictions/determinations of whether domains are malicious (e.g., an administrator of the customer). As an example, the likelihood threshold value is 85% likelihood that the domain is malicious. As another example, the likelihood threshold value is 90% likelihood that the domain is malicious. As another example, the likelihood threshold value is 95% likelihood that the domain is malicious. As another example, the likelihood threshold value is 99% likelihood that the domain is malicious. Various other threshold values may be implemented. In some embodiments, the likelihood that the newly registered domain is malicious is determined based at least in part on a degree of similarity between the newly registered domain and one or more other malicious domains. In some embodiments, the likelihood that the newly registered domain is malicious is determined based at least in part on a degree of similarity between the newly registered domain and one or more domains that are deemed benign.

According to various embodiments, the system applies a malicious domain detector in connection with determining whether the newly registered domain is malicious. The applying the applying malicious domain detector in connection with determining whether the newly registered domain is malicious may include applying a machine learning model to determine whether the newly registered domain is malicious. In some embodiments, the machine learning model is trained based at least in part on one or more domain registrations. For example, the machine learning model is trained using the historical information for the one or more domains (e.g., the third party indication whether the domain is malicious such as from a third party service, a community-based score, etc.). As another example, the machine learning model is trained based at least in part on one or more attributes associated with the one or more domain registrations.

At 1070, an active measure is performed with respect to malicious domains. In some embodiments, the active measure includes causing traffic with respect to (e.g., ingress and/or egress) the malicious domains to be restricted (e.g., blocked) or otherwise impeded. In some embodiments, the active measure includes causing attachments in traffic with respect to (e.g., ingress and/or egress) the malicious domains to be restricted (e.g., blocked) or otherwise impeded (e.g., an alert provided to a recipient to provide a warning that the attachment may be from a malicious sender). In some embodiments, the system may send to a security entity (e.g., a firewall) or network node (e.g., a client) an indication that the newly registered domain is malicious. The indication that the newly registered domain is malicious may correspond to an update to a blacklist of domains (e.g., corresponding to malicious domains). In some embodiments, in response to determining that the newly registered domain is malicious, the system pushes the indication that the newly registered domain is malicious or an update to a blacklist.

At 1080, a determination is made as to whether process 1000 is complete. In some embodiments, process 1000 is determined to be complete in response to a determination that no further traffic is to be analyzed (e.g., no further predictions for newly registered domains are needed), an administrator indicates that process 1000 is to be paused or stopped, etc. In response to a determination that process 1000 is complete, process 1000 ends. In response to a determination that process 1000 is not complete, process 1000 returns to 1010.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain registration information for a set of records in a WHOIS database;
determine that a newly registered domain is registered based at least in part on the registration information;
apply a malicious domain detector in connection with determining whether the newly registered domain is malicious, comprising applying a machine learning model to determine whether the newly registered domain is malicious, wherein:
the machine learning model uses one or more features that are based at least in part on the registration information;
the one or more features comprise at least one of (a) a reputation of a registrant with which a particular domain is registered, and (b) a time at which the particular domain was registered; and
in response to determining that the newly registered domain is malicious, send to a security entity an indication that the newly registered domain is malicious before the security entity obtains intercepted traffic for the newly registered domain; and
a memory coupled to the one or more processors and configured to provide the one or more processors with instructions.

2. The system of claim 1, wherein determining that the newly registered domain is registered comprises:
monitoring registration of one or more domains based at least in part on the registration information; and
detecting that the newly registered domain is registered based at least in part on the monitoring the registrations of one or more domains.

3. The system of claim 2, wherein the monitoring registration of one or more domains comprises:
receiving a list of domains that are newly registered.

4. The system of claim 3, wherein the domains that are newly registered is received at a predetermined frequency.

5. The system of claim 1, wherein the machine learning model is trained based at least in part on one or more domain registrations.

6. The system of claim 5, wherein the machine learning model is trained based at least in part on one or more attributes associated with the one or more domain registrations.

7. The system of claim 6, wherein the one or more attributes associated with a particular domain comprise a reputational score corresponding to the particular domain.

8. The system of claim 1, wherein:
the one or more processors are further configured to:
determine one or more attributes of the newly registered domain; and
a determination that the newly registered domain is malicious is based at least in part on the one or more attributes.

9. The system of claim 1, wherein:
applying the malicious domain detector in connection with determining whether the newly registered domain is malicious comprises:
determining a likelihood that the newly registered domain is malicious; and
the newly registered domain is deemed to be malicious in response to a determination that the likelihood that the newly registered domain is malicious is greater than a likelihood threshold value.

10. The system of claim 9, wherein the likelihood that the newly registered domain is malicious is determined based at least in part on a degree of similarity between the newly registered domain and one or more other malicious domains.

11. The system of claim 9, wherein the likelihood that the newly registered domain is malicious is determined based at least in part on a reputational score associated with an email comprised in a registration of the newly registered domain.

12. The system of claim 9, wherein the likelihood that the newly registered domain is malicious is determined based at least in part on a degree of similarity between the newly registered domain and one or more domains that are deemed benign.

13. The system of claim 1, wherein the security entity enforces one or more security policies with respect to the newly registered domain based at least in part on the indication that the newly registered domain is malicious.

14. The system of claim 13, wherein the one or more security policies are configured based at least in part on a customer setting.

15. The system of claim 13, wherein the security entity blocks traffic to the newly registered domain in response to receiving the indication that the newly registered domain is malicious.

16. The system of claim 1, wherein the security entity is a firewall.

17. The system of claim 1, wherein a determination of whether the newly registered domain is malicious is performed contemporaneous with registration of the newly registered domain.

18. The system of claim 1, wherein a determination that the newly registered domain is registered is made within thirty days of the newly registered domain being registered with a domain registrar.

19. The system of claim 1, wherein the registration information is obtained at least as frequently as weekly.

20. The system of claim 1, wherein the one or more features are based at least in part on contact information associated with the registration for the particular domain.

21. The system of claim 1, wherein the one or more features are based at least in part on a particular day of a week during which the particular domain is registered.

22. The system of claim 1, wherein the one or more features are based at least in part on a number of domains updated on a same day to have the same nameserver, registrar, registrant email, registrant organization, and email.

23. A method, comprising:
   obtaining registration information for a set of records in a WHOIS database;
   determining, by one or more processors, that a newly registered domain is registered based at least in part on the registration information;
   applying a malicious domain detector in connection with determining whether the newly registered domain is malicious, comprising applying a machine learning model to determine whether the newly registered domain is malicious, wherein:
      the machine learning model uses one or more features that are based at least in part on the registration information;
      the one or more features comprise at least one of (a) a reputation of a registrant with which a particular domain is registered, and (b) a time at which the particular domain was registered; and
   in response to determining that the newly registered domain is malicious, sending to a security entity an indication that the newly registered domain is malicious before the security entity obtains intercepted traffic for the newly registered domain.

24. A computer program product embodied in a non-transitory computer readable medium and comprising computer instructions for:
   obtaining registration information for a set of records in a WHOIS database;
   determining, by one or more processors, that a newly registered domain is registered based at least in part on the registration information;
   applying a malicious domain detector in connection with determining whether the newly registered domain is malicious, comprising applying a machine learning model to determine whether the newly registered domain is malicious, wherein:
      the machine learning model uses one or more features that are based at least in part on the registration information;
      the one or more features comprise at least one of (a) a reputation of a registrant with which a particular domain is registered, and (b) a time at which the particular domain was registered; and
   in response to determining that the newly registered domain is malicious, sending to a security entity an indication that the newly registered domain is malicious before the security entity obtains intercepted traffic for the newly registered domain.

* * * * *